US012415539B2

(12) United States Patent
Wang et al.

(10) Patent No.: US 12,415,539 B2
(45) Date of Patent: Sep. 16, 2025

(54) SYSTEMS AND METHODS FOR ACTIVE ROAD SURFACE MAINTENANCE WITH CLOUD-BASED MOBILITY DIGITAL TWIN

(71) Applicant: TOYOTA MOTOR ENGINEERING & MANUFACTURING NORTH AMERICA, INC., Plano, TX (US)

(72) Inventors: Ziran Wang, San Jose, CA (US); Rohit Gupta, Mountain View, CA (US); Kyungtae Han, Palo Alto, CA (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 17/992,364

(22) Filed: Nov. 22, 2022

(65) Prior Publication Data
US 2024/0166230 A1    May 23, 2024

(51) Int. Cl.
*B60W 60/00* (2020.01)
*B60K 35/00* (2024.01)
(Continued)

(52) U.S. Cl.
CPC .......... *B60W 60/001* (2020.02); *B60K 35/00* (2013.01); *B62D 15/029* (2013.01); *B60K 35/22* (2024.01);
(Continued)

(58) Field of Classification Search
CPC .. B60K 2360/166; B60K 35/00; B60K 35/22; B60K 35/28; B60W 2552/05;
(Continued)

(56) References Cited

U.S. PATENT DOCUMENTS 11,333,514 B2 *  5/2022  Cella ................. G10L 15/16
11,924,050 B2 *  3/2024  van den Berghe ...................
                                                H04L 41/0894
(Continued)

FOREIGN PATENT DOCUMENTS

CN      104164829 B     6/2017
CN      107239774 B     9/2020
(Continued)

OTHER PUBLICATIONS

Agrawal et al., "Digital Twin in Practice: Emergent Insights from an Ethnographic-Action Research Study," arXiv:2203.07030v1 [cs.CY] (https://doi.org/10.48550/arXiv.2203.07030).

*Primary Examiner* — Tyler J Lee
(74) *Attorney, Agent, or Firm* — SHEPPARD, MULLIN, RICHTER & HAMPTON LLP; Daniel N. Yannuzzi

(57) ABSTRACT

An active road surface maintenance system and method developed for connected vehicles with the aid of a mobility digital twin (MDT) framework. A method performed in a cloud-based digital space includes receiving data regarding a physical object from a physical space connected to a vehicle. The method also includes processing the data using machine learning to model road surface conditions, in which respective penalty values are assigned to corresponding road surfaces, a respective penalty value being higher the lower a condition of the corresponding road surface. The method also includes deriving instructions based on the modeled road surface conditions and the respective penalty values to guide actuation of the vehicle along a trajectory. The method further includes transmitting the instructions to the physical space connected to the vehicle to guide actuation of the vehicle.

20 Claims, 11 Drawing Sheets

(51) Int. Cl.
B62D 15/02 (2006.01)
E01C 23/01 (2006.01)
B60K 35/22 (2024.01)
B60K 35/28 (2024.01)

(52) U.S. Cl.
CPC ........ *B60K 35/28* (2024.01); *B60K 2360/166* (2024.01); *B60W 2552/05* (2020.02); *B60W 2554/20* (2020.02); *B60W 2554/402* (2020.02); *B60W 2554/4029* (2020.02); *B60W 2554/4049* (2020.02); *B60W 2554/408* (2020.02); *B60W 2555/20* (2020.02); *B60W 2556/10* (2020.02); *E01C 23/01* (2013.01)

(58) Field of Classification Search
CPC ....... B60W 2554/20; B60W 2554/402; B60W 2554/4029; B60W 2554/4049; B60W 2554/408; B60W 2555/20; B60W 2556/10; B60W 60/001; B62D 15/029; E01C 23/01

See application file for complete search history.

(56) References Cited

U.S. PATENT DOCUMENTS

| | | | |
|---|---|---|---|
| 2014/0195112 A1* | 7/2014 | Lu | B60G 17/015 703/2 |
| 2018/0210436 A1* | 7/2018 | Burd | G05B 19/41885 |
| 2020/0103244 A1* | 4/2020 | Cella | G06Q 30/0208 |
| 2020/0193463 A1* | 6/2020 | Cella | A61B 5/6893 |
| 2020/0194031 A1* | 6/2020 | Cella | G06V 20/64 |
| 2021/0146839 A1* | 5/2021 | Kim | G06V 20/588 |
| 2021/0272394 A1* | 9/2021 | Cella | G06Q 50/40 |
| 2022/0009469 A1* | 1/2022 | De Haseth | B60T 8/58 |
| 2022/0036302 A1* | 2/2022 | Cella | G06N 20/00 |
| 2022/0124001 A1* | 4/2022 | van den Berghe | H04L 41/145 |
| 2022/0126878 A1* | 4/2022 | Moustafa | G08G 1/096741 |
| 2022/0350943 A1* | 11/2022 | van den Berghe | G06F 30/20 |
| 2023/0058169 A1* | 2/2023 | Cella | G06N 3/042 |
| 2023/0085943 A1* | 3/2023 | Karri | G06Q 50/40 703/8 |
| 2023/0107120 A1* | 4/2023 | Kusaki | G06T 15/205 345/419 |
| 2023/0384107 A1* | 11/2023 | Salter | B60W 30/12 |
| 2024/0049109 A1* | 2/2024 | Agrawal | H04W 48/04 |
| 2024/0125899 A1* | 4/2024 | Khadem | G01S 7/4802 |
| 2024/0140445 A1* | 5/2024 | Zeng | G06N 3/045 |
| 2024/0140484 A1* | 5/2024 | Zeng | G05B 13/027 |
| 2024/0166213 A1* | 5/2024 | Ahmed | B60W 40/068 |

FOREIGN PATENT DOCUMENTS

| | | |
|---|---|---|
| CN | 112925657 A | 6/2021 |
| CN | 112802021 B | 7/2021 |
| KR | 101543342 B1 | 8/2015 |
| KR | 102217870 B1 | 2/2021 |
| WO | 2021222384 A1 | 11/2021 |
| WO | 2022083409 A1 | 4/2022 |
| WO | 2022119267 A1 | 6/2022 |

* cited by examiner

SYSTEMS AND METHODS FOR ACTIVE ROAD SURFACE MAINTENANCE WITH CLOUD-BASED MOBILITY DIGITAL TWIN

TECHNICAL FIELD

The present disclosure relates generally to digital twin technologies for mobility systems, such as vehicles. More particularly, the present disclosure relates to developing and using digital twins for human, vehicular, and traffic entities or aspects, with a cloud computing architecture having the ability to leverage real-time and historical data. In one aspect the present disclosure relates to an active road surface maintenance system and method developed for connected vehicles with the aid of a mobility digital twin (MDT) framework.

DESCRIPTION OF RELATED ART

A digital twin can refer to some representation, e.g., virtual, of an object, system, or other entity. That is, a digital twin acts as a digital counterpart or model to some physical object or process. The physical object/process can be outfitted with or monitored using sensors that generate data regarding various aspects of the physical object/process, e.g., the performance of the physical object. This generated data can be relayed to a processor or other computing system which may then apply the data to the digital twin. Thereafter, the digital twin or model can be used to run simulations, study performance, generate possible improvements, and so on.

BRIEF SUMMARY OF THE DISCLOSURE

The disclosed technology in accordance with one embodiment is directed to an active road surface maintenance system developed for connected vehicles with the aid of a Mobility Digital Twin (MDT) framework. Existing road surface maintenance systems operate in a passive manner, in that these systems act only after detecting in real time or encountering a road deficiency (e.g., delamination, cracking, potholes, fading of pavement lane markings and striping, etc.). Embodiments of the disclosed technology, however, provide guidance to connected vehicles in a more proactive way. Advanced sensing technology that may be equipped for example on humans (e.g., drivers, pedestrians, bikers), vehicles, traffic devices, and roads themselves provide road surface or other quality data to a MDT on the cloud, where machine learning algorithms use these data to assess current conditions of road surfaces, predict future conditions of the roads and model one or more "road digital twins." Guidance information is then generated by such road digital twins and sent back to connected vehicles in the real world, thereby assisting autonomous vehicles or human drivers to drive in a certain way to avoid excessive loads on certain areas of the road surface. In some embodiments, the actuation process of the vehicle is conducted via guiding an autonomous vehicle, or prompting a human driver, to travel on a trajectory that avoids surface lanes that need maintenance, as described further herein.

In some embodiments, predicting future conditions of road surfaces can be realized by leveraging historical or other sensor data of the road surfaces and the "road digital twins." Such conditions may include how soon a specific portion of the road surface will be cracked, slippery, etc. Guidance can then be given to vehicles and drivers to avoid further damages to the roads, and predictive or preemptive maintenance can also be given to the roads.

Accordingly, some embodiments of the disclosed technology utilize sensing technology that may be equipped for example on humans, vehicles, traffic devices, and roads to provide road surface or other data to an active road surface maintenance microservice or road digital twin of a MDT on the cloud, where machine learning algorithms use the data to model/predict current/future surface conditions of various roads or lanes. The active road surface maintenance microservice or road digital twin then generates guidance information and transmits it to connected vehicles in the real world, thereby guiding autonomous vehicles or human drivers to drive a proposed route to avoid excessive loads on certain roads or lanes of a road surface. In some embodiments, the actuation process of the vehicle is conducted via instructing an autonomous vehicle, or prompting a human driver, to travel on a trajectory or route that can avoid surface lanes that are in worse condition or that have a greater need for maintenance, as described further herein.

By virtue of the features of the present disclosure and according to some embodiments, one or more digital twins are used, based on inputs from humans and/or infrastructure, to proactively monitor the condition of a road surface to assess the condition of a road surface or predict potential future problems with the road surface in advance of route planning, in order to provide guidance to vehicles with respect to problematic road surfaces, particularly guidance directed to avoiding excessive loads on certain areas of the road surface. Typical systems are focused on, at most, extant road problems or other non-road conditions discovered passively after encountering a road surface deficiency.

In accordance with one embodiment, a method performed in a cloud-based digital space includes receiving data regarding a physical object from a physical space connected to a vehicle. The method also includes processing the data using machine learning to model road surface conditions, in which respective penalty values are assigned to corresponding road surfaces, a respective penalty value being higher the lower a condition of the corresponding road surface. The method also includes deriving instructions based on the modeled road surface conditions and the respective penalty values to guide actuation of the vehicle along a trajectory. The method further includes transmitting the instructions to the physical space connected to the vehicle to guide actuation of the vehicle.

The method may further include effecting the actuation of the vehicle along the trajectory when the vehicle is an autonomous vehicle, or prompting a human driver of the vehicle to drive along the trajectory when the vehicle is operated by the human driver. When the vehicle is operated by a human driver, the method may include displaying each respective lane of the road surfaces along the trajectory with an indicator that indicates the road surface condition of the respective lane. The indicators may comprise colors (or non-color markings) corresponding to respective conditions of the lanes (e.g., good condition, average condition, poor condition).

The physical object may comprise at least one of a vehicle, a human, and a traffic device. The data may be collected by one or more sensors communicating with the physical object. The collected data may be real-time information relating to one or more of the following: road surfaces, traffic flow, weather, ego vehicle, perception of neighboring vehicle, or occupant of ego vehicle. The processing of the data may further include storing the data in a data lake, wherein the data lake further comprises stored historical data, and wherein the processing of the data includes processing of the stored historical data in addition to the stored data received from the physical space.

In accordance with another embodiment, a cloud-based system effectuating an end-to-end framework comprises a cloud-based platform hosting one or more digital twins corresponding to one or more physical objects from a physical space connected to a vehicle, wherein one of the digital twins comprises a data lake and an active road surface maintenance microservice. A communications layer communicatively connects the one or more digital twins to the one or more physical objects. The communications layer transmits data regarding the one or more physical objects to at least the one or more corresponding digital twins, and transmits instructions that have been derived from processing of the transmitted data by at least the active road maintenance microservice to the physical space connected to the vehicle. The active road maintenance microservice (1) processes the data using machine learning to model road surface conditions, in which a rewards function assigns respective rewards values to corresponding road surfaces, a respective rewards value being higher the higher a condition of the corresponding road surface, and (2) derives the instructions based on the modeled road surface conditions and on optimizing the rewards function to guide actuation of the vehicle along a trajectory.

In accordance with another embodiment, a method performed in a cloud-based system effectuating an end-to-end framework comprises the following in a digital space: receiving data regarding a physical object from a physical space connected to a vehicle; processing the data using machine learning to model road surface conditions, including using a rewards function to assign respective rewards values to corresponding road surfaces, a respective rewards value being higher the higher a condition of the corresponding road surface; deriving instructions based on optimizing the rewards function to guide actuation of the vehicle along a trajectory; and transmitting the instructions to the physical space connected to the vehicle to guide actuation of the vehicle. The method further comprises the following in the physical space: receiving the transmitted instructions; determining whether the vehicle is an autonomous vehicle or a non-autonomous vehicle; and, when the vehicle is an autonomous vehicle, navigating the vehicle along the trajectory using the instructions, or when the vehicle is a non-autonomous vehicle prompting a human driver to navigate the vehicle along with trajectory using the instructions.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
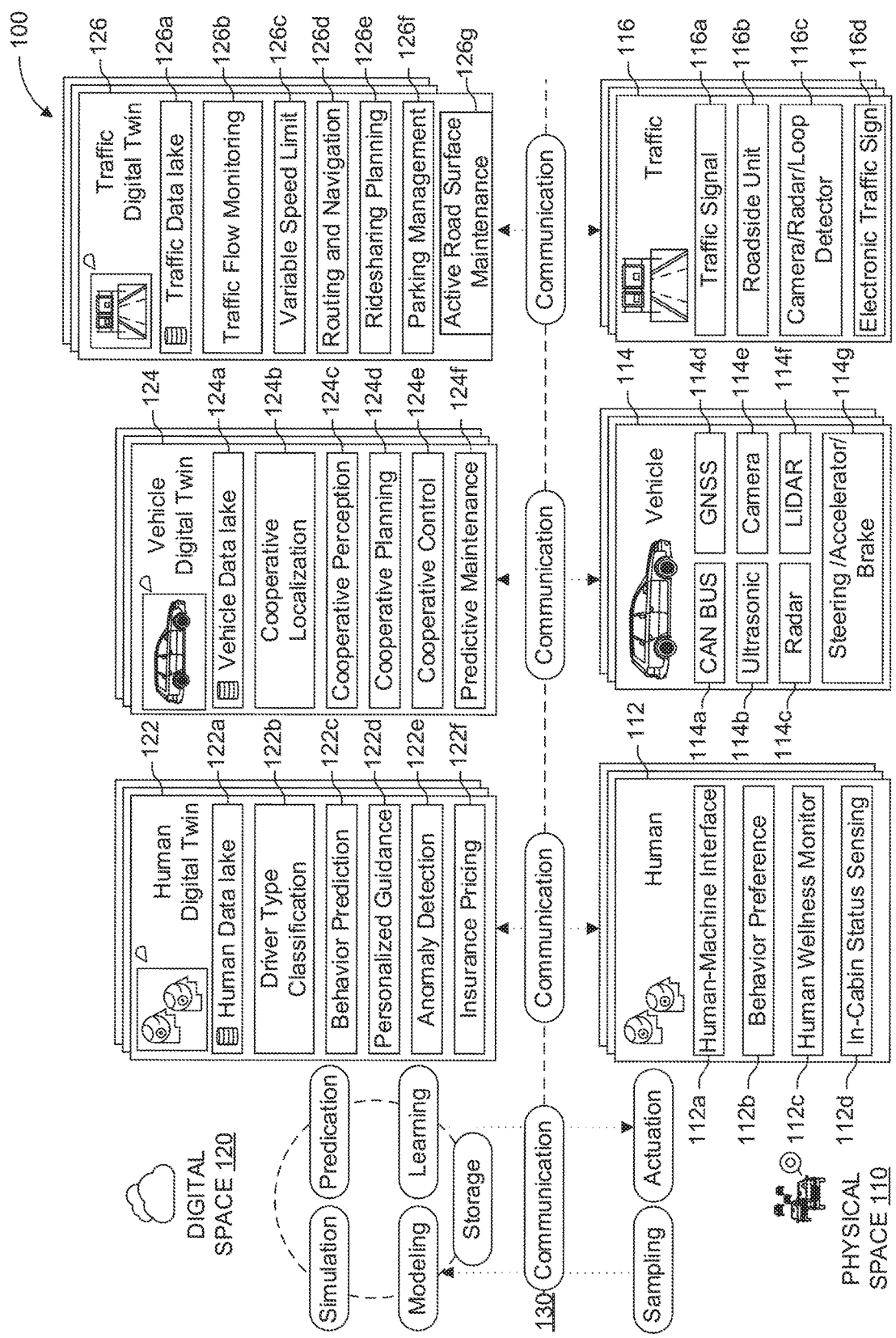
FIG. 1 illustrates an example mobility digital twin framework for active road surface maintenance in accordance with some embodiments of disclosed technology.

The figures are not exhaustive and do not limit the present disclosure to the precise form disclosed.

DETAILED DESCRIPTION

Embodiments of the present disclosure are directed to a mobility digital twin (MDT) framework/system for use with connected vehicle technology and implemented using cloud computing. In one aspect the present disclosure relates to an active road surface maintenance system developed for connected vehicles with the aid of the MDT framework. Embodiments of the disclosed technology provide guidance to connected vehicles in a proactive way. Sensing technology that may be equipped for example on pedestrians, vehicles, and roads themselves provide road surface or other quality data to an MDT on the cloud, where machine learning (ML) algorithms use these data to assess current conditions of roads in advance of route planning, or predict future conditions of roads, and model the "road digital twins." Guidance information is then generated by such road digital twins and sent back to connected vehicles in the real world, thereby assisting or guiding them to drive in a certain way to avoid excessive loads on certain areas of the road surface. In some embodiments, the actuation process of the vehicle is conducted via guiding the vehicle or driver to travel on a trajectory that avoids surface lanes that need maintenance, as described further herein. In another example the prediction of future road or lane conditions is used to guide vehicles to avoid certain roads and lanes to keep them from falling into further disrepair. In another example the prediction of future road or lane conditions is used to target the road or lane for maintenance.

The MDT framework may comprise a plurality of functional layers that correspond to (1) a physical space associated with objects of interest, (2) a digital space comprising the digital twins representative of the objects of interest; and (3) a communications layer that enables communications between the physical and digital spaces. Moreover, such an MDT framework may be implemented as a cloud-based framework. It should be noted that while the physical space typically comprises physical entities, in some embodiments, the physical space can include processes or other aspects of an environment/scenario that are of interest and would benefit from a corresponding digital twin.

Traditional mobility system frameworks tend to rely heavily on onboard storage and computing. Thus, the MDT system can realize the following advantages over such traditional mobility system frameworks. One advantage relates to power; that is, the MDT system enables users to rapidly adjust cloud resources to meet fluctuating/unpredictable demands, as well as provide high computing power at certain periods of peak demand. Another advantage is manageability; that is, the MDT system allows users to get their microservices up and running faster on the cloud platform, with improved manageability and less maintenance. Over-the-air (OTA) updates are also possible with the MDT framework. Yet another advantage is shareability; that is, bulk data generated by an end user can be offloaded and stored on the cloud, which can be shared, on-demand, with other end users, e.g., for those end user's microservices. Additionally still, another advantage of the MDT system is that arbitrary mobility microservices can be easily implemented on the MDT framework with minimal change to any existing cloud architecture and data structure.

It should be understood that microservices can refer generally to processes that communicate over a network to fulfill some goal or achieve some desired result using, e.g., technology-agnostic protocols, such as the Hypertext Transfer Protocol (HTTP). Microservices, as can be appreciated by the name, tend to be small in size relative to typical services which can be thought of as layers of an application. In the context of the various disclosed/contemplated embodiments, microservices can represent applications for mobility digital twins that benefit any one or more corresponding physical objects/processes. Microservices can take advantage of storage, modeling, simulation, learning, and prediction operations. The edge/cloud architecture described herein according to some embodiments of the disclosed technology includes active road surface maintenance microservices that may be implemented by, e.g., Amazon Web Services (AWS), in which the active road surface maintenance is served as a microservice in Amazon Virtual Private Cloud (VPC); of course, embodiments of the present disclosure are not limited to AWS, and other cloud computing services, platforms, APIs, etc. can be used to implement the disclosed technology.

Compared to conventional digital twin frameworks/systems that are built for mobility systems, embodiments of the MDT system disclosed herein may realize the following advantages.

First, the MDT system leverages cloud computing. That is, in some embodiments, the MDT system can be implemented on a cloud architecture, e.g., based on a commercial cloud platform such as AWS or others, using particular components/elements designed to operate within the MDT framework/system.

Second, embodiments of the present disclosure are not limited to vehicular digital twins. Rather, embodiments of the present disclosure can leverage human and traffic digital twins, in addition to vehicle digital twins, as well as the connections between or among the digital twins. As alluded to above, digital twins of the MDT framework may include human digital twins (representative of vehicle occupants or other human actors in the mobility space/context), vehicle, and traffic digital twins (which can be representative of traffic flow, road conditions, weather, etc.). Digital twins of the MDT framework may also include road digital twins. Road digital twins can be representative of the present conditions of road surfaces and lanes caused by over-usage, wear and tear, weather, natural occurrences, etc., and can use data from sensors for example to model present/future conditions of road surfaces and lanes via machine learning, and generate guidance to send to connected vehicles and their drivers. In this way an active road surface maintenance microservice can be provided. The data and models associated with these digital twins can also be beneficial to other elements/aspects of the MDT system, as will be discussed in greater detail below.

Third, embodiments of the present disclosure may leverage data associated with different time horizons, e.g., real-time as well as historical data. That is, besides the data that is sampled in real-time, historical data can also be retrieved from a corresponding digital twin(s)' corresponding data lake to provide preference information of a specific physical entity. Combined with the real-time and historical data, predictions of future information can also be generated, and such data can be useful for all physical entities in an MDT framework.

FIG. 1 illustrates an example MDT framework/system 100 in accordance with some embodiments of the present disclosure. As illustrated in FIG. 1, MDT system 100 may include a first space, e.g., physical space 110, in which human actors 112, vehicle actors 114, and traffic actors or infrastructures 116 logically "reside." Sampling and actuation processes or procedures may occur in physical space 110. That is, sensors or devices capable of monitoring actors detect the dynamic status of an actor, any ongoing operations, or any event occurrences associated with the actor or impacting the actor. This sensor data or information, e.g., data samples or measurements, can be aggregated for transmission to digital space 120, where digital replicas of those physical entities are located. Such data/information can be analyzed or processed by digital space 120 vis-à-vis the respective digital twins to which the data/information apply. Processing/analyzing the data can comprise different operations, but will ultimately produce some output(s) from a mechanism, such as a machine learning algorithm, a resulting perception, etc. that can be used to guide or instruct/command/prompt/suggest a corresponding actuation to be performed by an actor. That is, the results of the digital twin processing can be used to effectuate actuation operations by the physical entities in physical space 110, achieving an MDT system that is also an end-to-end framework, and that can be driven by physical entities in physical space 110. It should be understood that although embodiments are described in the context of vehicular mobility and thus involve human, vehicle, and traffic actors, embodiments may be adapted for use in other contexts, with other physical entities, and from which other types or kinds of digital twins may be developed and used. In an active road service maintenance embodiment of the disclosed technology, for example, sensors or devices from one or more human actor 112, vehicle actor 114, or traffic actor 116 can provide sensor data or information, e.g., data samples or measurements, to digital space 120, as described further below.

MDT system 100 may further include a communications layer 130. As can be appreciated in FIG. 1, communications layer 130 can reside between physical space 110 and digital space 120. Communications layer 130 can provide seamless connections between these two spaces. It should be understood that seamless connections can refer to communications connections across which there are no packet losses, and only minimum time delay are experienced for communications between the digital and physical spaces, 120 and 110, respectively. Multiple aspects/elements can make up the communications layer 130, including an IoT Core 420, edge gateway 432, middleware 422, and bulk data ingestion 424 components in FIG. 4. Accordingly the communication layer 130 can allow real-time and non-real-time data streaming for both upstream (to the digital space 120) and downstream (to the physical space 110).

As the MDT framework is an end-to-end framework, the physical space 110 of this framework is in charge of both ends of the framework, namely, sampling and actuation. In some embodiments no (or only minimal) computational work needs to be conducted in the physical space 110, since all (or a majority) of such work can be offloaded to the digital space 120 through communication.

As described above, the MDT system 100's end-to-end process may begin by sampling data in physical space 110. All or part of the sampled data may then be transmitted upstream to digital space 120 via the communication layer 130. That sampled data can progress through one or more processes in digital space 120, internally, including storage, modeling, simulation, learning, prediction, and the like. The resulting output data can be transmitted downstream to physical space 110 via the communication layer 130. That resulting output data, upon receipt, can be applied by actuators of physical space 110 to fulfill the end-to-end process.

In some embodiments, leveraging the cloud space may be realized by digital space 120 of the MDT system 100 being deployed fully or at least partially in a public, private, or hybrid cloud. A public cloud may share publicly available resources/services/microservices over, e.g., the Internet, while a private cloud is not shared and may only offer resources/services/microservices over a private data network. A hybrid cloud may share services/microservices between public and private clouds depending on the purpose of the services/microservices. Therefore, communications layer 130 provides access to the cloud for physical space 110, either via direct access or indirect access (vis-a-vis network edge computing components). The MDT framework 100 does not necessarily require any specific wireless communications technology to be used by or on communication layer 130, so long as it is capable of transmitting information or data between physical space 110 and digital space 120.

Physical space 110, as illustrated in FIG. 1, may as noted above a include human actor 112. Human actor 112 may be associated with sensors, such as a human wellness monitor 112c, one or more sensors/monitors generating/recording behavior preference data 112b, or in-cabin status sensors 112d, such as seat/pressure sensors. Such sensors may be used to generate or obtain current/real-time data regarding human actor 112. In accordance with some embodiments, any and all human beings (or pets/living beings) involved or related to a particular context, such as transportation/mobility can be considered. For example, in addition to vehicle drivers, vehicle passengers, pedestrians, cyclists, etc. may make up physical space 110.

The sampling process that can be performed by sensors or monitoring devices associated with the relevant physical actors of physical space 110 can be accomplished in part by human-machine interface 112a as an active manner. That is, human-machine interface 112 may comprise an interface by which a human actor 112 can input relevant information or data that may be obtained for processing/analysis by a corresponding digital twin in digital twin space 120, in this example, human digital twin 122.

Sampling may also be accomplished by in-cabin or on-vehicle status sensors 112d (e.g., camera, seat sensor, etc.), human wellness monitor 112c (e.g., smartwatch, electrocardiogram, etc.), and other perception sensors. The preferences of a human's behavior can also be set actively (e.g., a driver manually sets a preferred cruise control speed). Human preferences may also be measured passively (e.g., a pedestrian's preferred trajectory of crossing a crosswalk is recorded by a vehicle/intersection camera), where both the crosswalk and pedestrian may be considered part of physical space 110. Behavior preference sensor 112b can be representative of any one or more sensors or mechanisms with which behavioral preferences can be measured.

As noted above, actuation can be performed in physical space 110. In the context of human actor 112, where human actor 112 happens to be a vehicle driver, actuation may be accomplished by the vehicle driver actuating or operating some aspect of a vehicle based on the output from digital twin space 120, in particular, human digital twin 122. For example, human wellness monitor or sensor 112c may obtain data representative of the vehicle driver's state, such as temperature, direction of gaze, detectable markers of health wellness or distress (such as sweating). Such data may be communicated to human digital twin 122 via communications layer 130. Human digital twin 122 may analyze/process the data and output some prediction, instruction, command, suggestion, notification, or other guidance, etc. In this example, the instruction may be a notification sent to a display of the vehicle directing the driver of the vehicle to slow down because the driver, based on the obtained data, is determined to be in sick or in some otherwise, non-optimal state for driving. In response, the vehicle driver should actuate the brakes of the vehicle and slow down.

In the foreseeable future, the world's transportation system will likely remain a mixed autonomy traffic environment, where only part of all vehicles will be fully autonomous vehicles (with SAE level-5 automation), and the majority are still operated by human drivers (without any automation or some degree of automation). Therefore, if drivers can be provided with additional information from the digital space 120 of MDT system 100, such as an adjacent vehicle's lane-change possibility or upcoming signal timing, their actuation will be more accurate, and in turn benefit other entities in the transportation system.

Vehicles can be thought of as comprising the core or base of the MDT framework/system 100. Indeed, vehicles can act as the "host" of drivers and passengers, and are also a fundamental component of traffic. As can be seen in FIG. 1, all sensors or other components in physical space 110—not only those associated with vehicle actor 114 itself, but also those associated with human actor 112 and traffic actor 116 and the Traffic block, are directed to vehicle-related activities. However, and again, the context and particular actors/sensors/mechanisms illustrated or described herein are non-limiting examples.

As illustrated in FIG. 1, vehicle actor 114 may be associated with a localization component, such as a Global Navigation Satellite System (GNSS) sensor/receiver 114d, perception sensors (which can include, as illustrated, ultrasonic sensor 114b, camera 114e, radar 114c, and Light Detection and Ranging (LIDAR) sensors 114f), and a vehicle's internal communication mechanism, e.g., a Controller Area Network (CAN) bus 114a. Such components can be involved in the sampling operations performed by vehicle actor 114. Related data, such as positions, speeds, and accelerations of the vehicle and its surrounding vehicles can be sampled with these or other appropriate sensors or other physical components. The captured or sampled data can then be propagated to digital space 120 through communications layer 130.

The actuation functionality of vehicle actor 114, in some embodiments, can be effectuated by one or more vehicle systems or components used to generate movement or accomplish some other operation. For example, vehicle actor 114 may be associated with or comprise vehicle motive systems 114g, e.g., a vehicle steering system, an accelerator, and brakes. These physical components are able to actuate any lateral or longitudinal control command received from the digital space 120, and therefore allow a vehicle to achieve its desired motion or position or action. In some embodiments of the disclosed technology that are directed more particularly to active road surface maintenance, the actuation process of the vehicle may be conducted for example via traveling (pursuant to guidance or an instruction/suggestion/notification) on a trajectory or route that can avoid surface lanes that need maintenance (or that have a greater need for maintenance than other surface lanes), as discussed further in connection with FIGS. 5 and 6 below.

Figure 2:
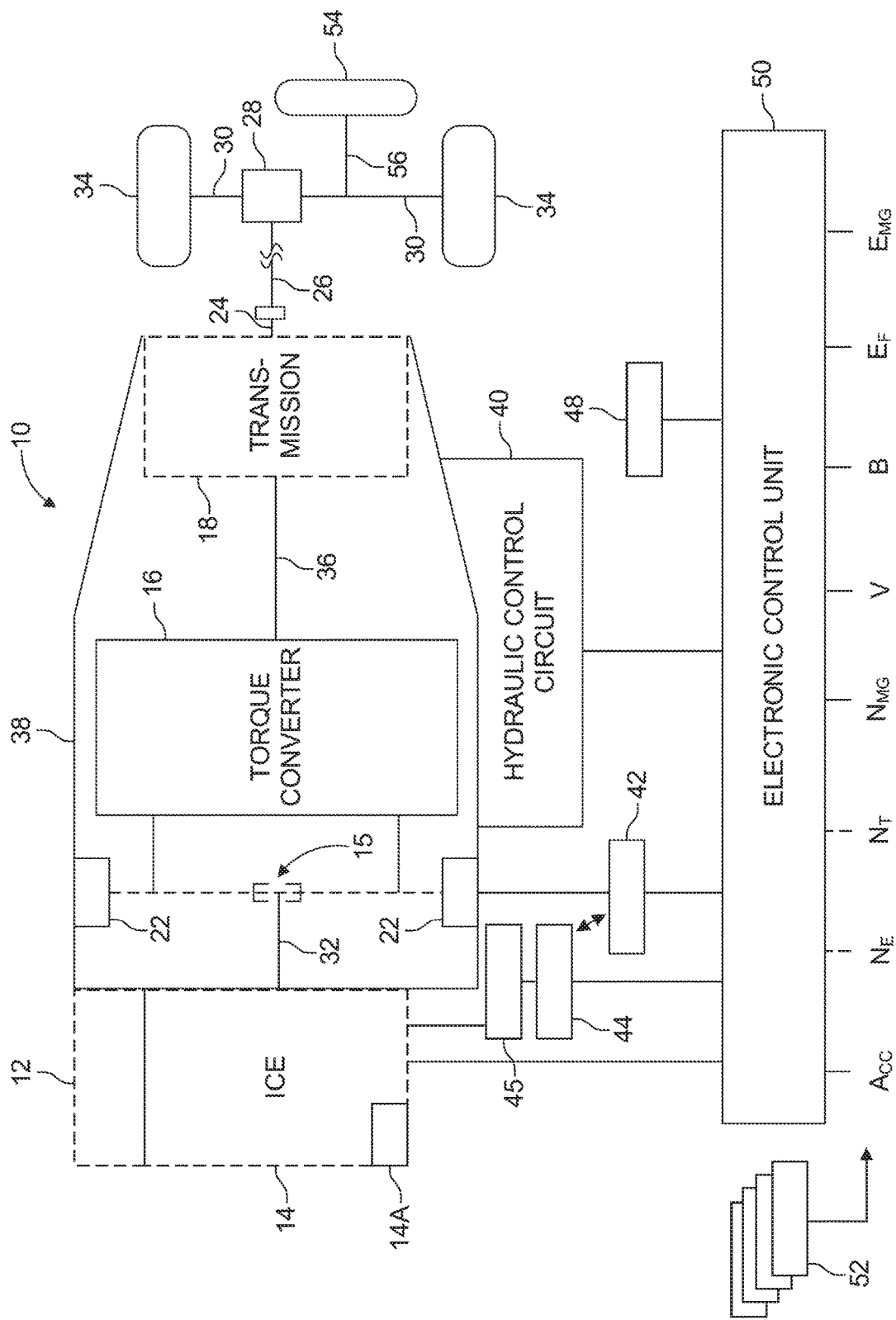
FIG. 2 is a schematic representation of an example vehicle with which some embodiments of the disclosed technology may be implemented.

The systems and methods disclosed herein may be implemented with any of a number of different vehicles and vehicle types. For example, the systems and methods disclosed herein may be used with automobiles, trucks, motorcycles, recreational vehicles, boats, and other like on- or off-road vehicles. In addition, the principals disclosed herein may also extend to other vehicle types as well. An example hybrid electric vehicle (HEV) in which embodiments of the disclosed technology may be implemented is illustrated in FIG. 2. Although the example described with reference to FIG. 2 is a hybrid type of vehicle, the systems and methods for predictive perception assessment can be implemented in other types of vehicle including gasoline- or diesel-powered vehicles, fuel-cell vehicles, electric vehicles, or other vehicles.

FIG. 2 illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30. Direction of travel of the vehicle (e.g., a moving direction or heading) may be based on the angle of the one or more wheels 34, which can be controlled by steering wheel 54. Rotation of steering wheel 54 may be transmitted to axles 30 by steering column 56 coupled to the axles 30 so to convert rotational motion of the steering wheel into translational motion of the axles (e.g., a rack and pinion steering or the like). Translational motion of the axles 30 is transferred to the wheels to change the wheel angle in accordance with the rotation of the steering wheel 54.

As an HEV, vehicle 10 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 10 relies on the motive force generated at least by internal combustion engine 14, and a clutch 15 may be included to engage engine 14. In the EV travel mode, vehicle 10 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 10 and is powered electrically via battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 may operate as a generator.

Motor 22 can be powered by battery 44 to generate a motive force to move the vehicle and adjust vehicle speed. As noted above motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit (ECU) 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement, depending on the pressure applied to the clutch. For example, a torque capacity of clutch 15 may be controlled according to the hydraulic pressure supplied from a hydraulic control circuit 40. When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 10 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 2, electronic control unit 50 receives information from a plurality of sensors included in vehicle 10. For example, electronic control unit 50 may receive signals that indicate vehicle in-vehicle operating conditions or characteristics, or signals that can be used to derive vehicle operating conditions or characteristics. These may include, but are not limited, to accelerator operation amount ($A_{CC}$), a revolution speed ($N_E$) of internal combustion engine 14 (engine RPM), a rotational speed of the motor 22 (motor rotational speed), and vehicle speed (NV). These may also include torque converter 16 output ($N_T$) (e.g., output amps indicative of motor output), brake operation amount/pressure (B), battery SOC (i.e., the charged amount for battery 44 detected by a system on chip (SOC) sensor). Sensors 52 can also detect a gas pedal position, a brake pedal position, and a steering wheel position (e.g., an angle from a neutral steering wheel position). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In various embodiments, sensors 52 may be included to detect one or more conditions directly or indirectly such as, for example, fuel efficiency ($E_F$), motor efficiency ($E_{MG}$), hybrid (internal combustion engine 14+MG 12) efficiency, acceleration ($A_{CC}$), etc. Sensors 52 may also be included to detect one or more conductions, such as brake pedal actuation and position, accelerator pedal actuation and position, and steering wheel angle, to name a few.

Additionally, one or more sensors 52 can be configured to detect and/or sense position and orientation changes of the vehicle 10, such as, for example, based on inertial acceleration, trajectory, and so on. In one or more arrangements, electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, electronic control unit 50 receives signals from a speedometer to determine a current speed of the vehicle 10.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions and dynamics but also to detect external conditions as well, for example, contextual information of the surrounding environmental conditions. Sensors that might be used to detect external conditions can include, for example, sonar, radar, lidar or other vehicle proximity sensors, and cameras or other image sensors. Such sensors can be used to detect, for example, traffic signs indicating a current speed limit, road curvature, road type, obstacles (e.g., other surrounding vehicles and objects), space gaps with obstacles, weather, time of day, road type, road surface conditions, and a traffic conditions, and so on. Still other sensors may include those that can detect road grade. While some sensors can be used to actively detect passive environmental objects, other sensors can be included and used to detect active objects such as those objects used to implement smart roadways that may actively transmit and/or receive data or other information. Sensors 52 may be equipped for example on pedestrians, vehicles, and roads themselves.

Accordingly, the one or more sensors 52 can be configured to acquire and/or sense external environmental conditions. For example, environment sensors can be configured to detect, quantify and/or sense objects in at least a portion of the external environment of the vehicle 10 and/or information/data about such objects. Such objects can be stationary objects and/or dynamic objects. Further, the sensors 52 can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, potholes, boggy conditions, bulldust, changing surface conditions, corrugations, floodways, loose surfaces, rough surfaces, rutting, slippery surfaces, stream crossings, washouts, etc. Several of these conditions of the external environment are described in more detail below.

Sensors 52 may be included to detect not only external conditions but also to detect internal conditions as well, for example, contextual information of the environmental conditions inside the cabin of the vehicle, for example, in-cabin conditions. Sensors that might be used to detect in-cabin conditions can include, for example, sonar, radar, lidar or other proximity sensors, and cameras or other image sensors. Such sensors can be used to detect, for example, occupants of the vehicle; head status (e.g., head position or facing direction) of occupants, such as a driver; eye status (e.g., open/closed status, eye position, and eye movement) of occupants, such as the driver; and so on.

Accordingly, the one or more sensors 52 can be configured to acquire and/or sense in-cabin conditions. For example, in-cabin sensors can be configured to detect, quantify and/or sense objects and status in at least a portion of the cabin of the vehicle 10 and/or information/data about such objects. Such objects can be stationary objects and/or dynamic objects.

The detected data discussed herein may be included as vehicle-related data. For example, sensors 52 may acquire internal vehicle information, external environment data, in-vehicle operating conditions and dynamics, or any other information described herein. In some examples, sensors 52 may generate the vehicle-related data and/or other vehicle systems illustrated in FIGS. 1-4 may receive the data from sensors 52 to generate the vehicle-related data.

Returning to FIG. 1, it should be noted that existing intelligent vehicle platforms and applications, such as Advanced Driver Assistance Systems (ADAS) or Autonomous Driving Systems (ADS), only focus on their performances on an ego vehicle without considering interactions with the larger-scale traffic network. In contrast, yet another actor in physical space 110 comprises traffic actor 116. Traffic, although not typically modeled as a digital twin in conventional systems and methodologies, obviously can impact vehicle operation, human interactions, and other vehicles/traffic. Thus, MDT system 100, which includes traffic actor 116, can not only benefit connected vehicles and their occupants, but also the traffic network as a whole.

Traffic actor 116 in physical space 110 can include or be associated with various traffic infrastructures, such as traffic signals 116a, roadside units 116b, camera/radar/loop detectors 116c, and electronic traffic signs 116d. These physical components are able to either generate data (e.g., signal phase and timing) by themselves, or measure data (e.g., traffic count and traffic flow) generated by other traffic entities. Such data is sampled and sent to the digital space 120 through communication layer 130, which can also benefit other building blocks of the MDT framework 100. In some embodiments of the disclosed technology that are directed more particularly to active road surface maintenance, some of the physical entities that are used (e.g., in-pavement surface temperature and condition sensors, in-pavement surface chemical and concentration sensors, roadside monitoring channels, cameras sensing road surface perception and depth, real-time monitoring systems running on a mobile phone) are described further below.

On the other hand, guidance or adjustment received from the digital space 120, i.e., actuation, can also be accomplished by traffic actor 116 to improve the safety and efficiency of a traffic network (whether local to a current location of a vehicle or the larger traffic network). For example, the signal phase and timing of traffic signals 116a can be adjusted to better serve different traffic flows under different situations. Guidance or warning information can be broadcast to connected vehicles via roadside units 116b, and to all traffic entities via electronic traffic signs 116d.

Human digital twins, an example of which is human digital twin 122, are digital replicas of real humans in the physical space, i.e., physical space 110. This building block in digital space 120 has a human data lake 122a that stores all data sampled from human actor 112 in physical space 120, where different humans may have their personal databases differentiated from others. For example, each human actor/human digital twin may be associated with a unique identifier or uniquely correlated with one another. With real-time data sampling and historical data storage, human digital twin 122 is able to classify human actors, e.g., vehicle drivers, into specific driver types by machine learning algorithms like k-nearest neighbors (KNN), as one example (those of ordinary skill in the art would understand/know other appropriate algorithms/mechanisms), and to provide guidance in a customized or personalized manner.

As alluded to above, data regarding any one or more actors can be leveraged/used by any one or more digital twins. In other words, communications layer 130 need not only communicate data/information between a particular actor and its corresponding digital twin, but may communicate data/information between any actor(s) and any digital twin(s). For example, taking advantage of the data coming from vehicle actor, human digital twin 122 can also predict future behaviors of drivers (e.g., lane-change intention) and detect any anomalies (actions or operations that are not considered acceptable, e.g., swerving left/right in a lane of travel, accelerating and braking aggressively, cutting in/out of traffic, etc.). It should be noted that different contexts, actors, etc. may dictate what constitutes normal/abnormal or acceptable/unacceptable actions/operations. The results of the aforementioned microservices (driver type classification 122b, behavior prediction 122c, personalized guidance 122d, anomaly detection 122e) can be applied to third parties such as insurance companies, where they can further build a microservice to set the insurance pricing for different drivers based on their driving behaviors (i.e., insurance pricing 122f).

Vehicle digital twins, an example of which is vehicle digital twin 124, are the digital replicas of real vehicles in the physical space, e.g., physical space 120. Once the sampled data is received from a connected vehicle in the physical space, e.g., vehicle actor 114, it can be saved in this particular vehicle's data lake, e.g., vehicle data lake 124a with a unique identifier, e.g., a unique identification number. The data associated with vehicle digital twin 124 about vehicle actor (e.g., an ego vehicle) 114, for example, position, speed, and acceleration, as well as its surrounding environment (perceived by perception sensors not shown) can also be shared with human digital twin 122, traffic digital twin 124, road digital twin as may be embodied by active road maintenance microservice 126g using traffic data lake 126a, for example, or other connected vehicles' vehicle digital twins for various microservices.

With massive data storage and data sharing in the digital space 120, multiple vehicle-related microservices can be enabled, such as microservices requiring cooperation among multiple connected vehicles, including but not limited to, e.g., cooperative localization 124b, cooperative perception 124c, cooperative planning 124d, and cooperative control 124e. Additionally, microservices that need time-series data can also benefit from this MDT framework 100, where one typical example is predictive maintenance 124f. That is, based on modeling and simulation of the time-series vehicle data that is sampled from vehicle actor 114 in physical space 120 and stored "in" the vehicle digital twin 124, i.e., stored in/as part of vehicle data lake 124a, a learning process can be conducted in the digital space 120 and predictions can be made regarding potential failures of vehicle components at a future time. Such prediction results can be used by the vehicle owner or manufacturer to schedule onsite maintenance before the components break down. It should be understood that each of human data lake 122a, vehicle data lake 124a, and traffic data lake 126a can refer to any appropriate data/storage repository or repositories that hold the data communicated to digital space 120 from physical space 110 by communications layer 130. Typically, the data stored in the respective data lakes will be raw data, e.g., data in its native form, prior to being analyzed or otherwise processed.

Figure 3A:
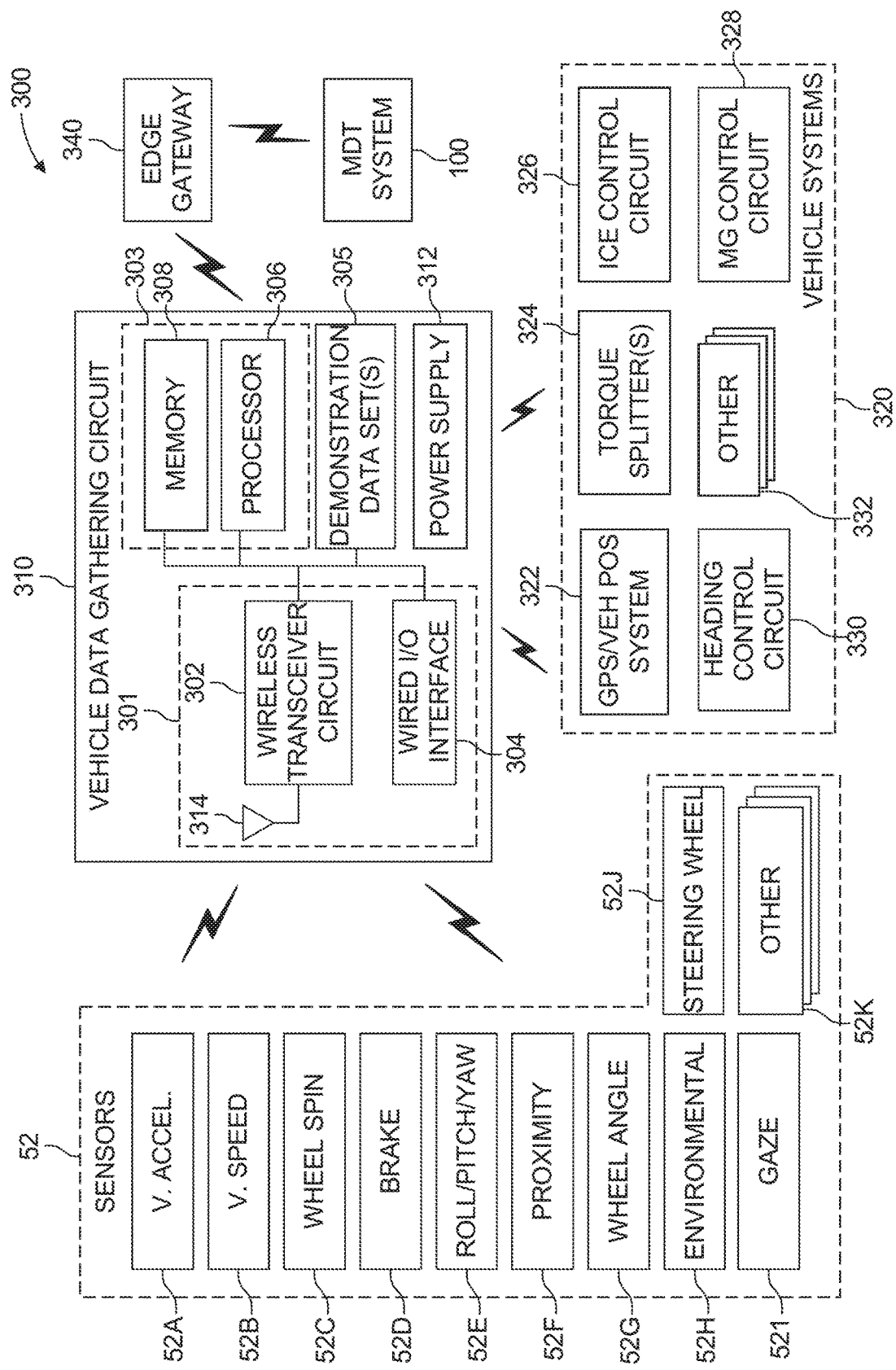
FIG. 3A illustrates an example vehicle architecture corresponding to a vehicle aspect of the mobility digital twin framework of FIG. 1.

FIG. 3A is an example system architecture of a vehicle 300 which can be an embodiment of vehicle actor 114/vehicle 10, and will be described in conjunction with FIG. 3B, a flow chart illustrating example operations for communicating data from an actor, e.g., vehicle 114, in the physical space 110 to a digital mobility twin, e.g., vehicle digital twin 124. FIG. 3A will also be described in conjunction with FIG. 3C, a flow chart illustrating, from a mobility digital twin perspective, how data from a physical actor in the physical space 110 is obtained by the mobility digital twin in digital space 120. Vehicle 300 of FIG. 3A can also be operated in conjunction with FIGS. 5 and 6. In this example, vehicle 300 comprises vehicle data gathering circuit 310, a plurality of sensors 52, and one or more vehicle systems 320. Sensors 52 and vehicle systems 320 can communicate with vehicle data gathering circuit 310 via a wired or wireless communication interface. Although sensors 52 and vehicle systems 320 are depicted as communicating with vehicle data gathering circuit 310, they can also communicate with each other as well and with other vehicle systems. Vehicle data gathering circuit 310 can be implemented as an ECU or as part of an ECU such as, for example ECU 50. In other embodiments, vehicle data gathering circuit 310 can be implemented independently of an ECU.

Vehicle data gathering circuit 310, in this example, includes a communication circuit 301, a decision circuit 303 (including a processor 306 and memory 308 in this example) and a power supply 312. Components of vehicle data gathering circuit 310 are illustrated as communicating with each other via a data bus, although other communication in interfaces can be included.

Processor 306 can include a GPU, CPU, microprocessor, or any other suitable processing system. Memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308 can be made up of one or more modules of one or more different types of memory and may be configured to store data and other information as well as operational instructions that may be used by the processor 306 to control vehicle data gathering circuit 310.

Although the example of FIG. 3A is illustrated using processor and memory circuitry, as described below with reference to circuits disclosed herein, decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up vehicle data gathering circuit 310.

Communication circuit 301 may be either or both a wireless transceiver circuit 302 with an associated antenna 314 and a wired I/O interface 304 with an associated hardwired data port (not illustrated). Communication circuit 301 can provide for V2X, V2I, and/or V2V communications capabilities, allowing vehicle data gathering circuit 310 to communicate with roadside equipment or infrastructure (e.g., traffic signal 116a or roadside unit 116b or others (FIG. 1), cloud devices (e.g., cloud servers in the digital space 120) vis-à-vis communications layer 130 (FIG. 1)), or other vehicles.

As this example illustrates, communications with vehicle data gathering circuit 310 can include either or both wired and wireless communications circuits 301. Wireless transceiver circuit 302 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by vehicle data gathering circuit 310 to/from other entities such as sensors 52 and vehicle systems 320.

Wired I/O interface 304 can include a transmitter and a receiver (not shown) for hardwired communications with other devices. For example, wired I/O interface 304 can provide a hardwired interface to other components, including sensors 52 and vehicle systems 320. Wired I/O interface 304 can communicate with other devices using Ethernet or any of a number of other wired communication protocols whether standardized, proprietary, open, point-to-point, networked or otherwise.

Power supply 310 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 1 or FIG. 2, or others. Sensors 52 can include additional sensors that may or may not otherwise be included on a standard vehicle. In the illustrated example, sensors 52 include operational sensors, for example, sensors to detect engine operating characteristics (e.g., fuel flow, RPM, oxygen flow, engine oil temperature, and so on); sensors to detect vehicle operating characteristics (e.g., steering input sensors such as a steering wheel encoder, brake sensors to detect the amount of braking applied, sensors to detect the amount of throttle/accelerator input, and so on) and sensor to detect vehicle dynamics (e.g., accelerometers to detect vehicle roll, pitch and yaw, accelerometers to detect wheel displacement, and so on).

For example, as shown in FIG. 3A, sensors 52 may include operational sensors, such as but not limited to, vehicle accelerator sensors 52A to detect accelerator pedal actuation and/or pedal position (e.g., an amount of throttle input), vehicle speed sensors 52B to detect vehicle speed, wheelspin sensors 52C (e.g., one for each wheel), brake sensor 52D to detect brake pedal actuation and/or to pedal position (e.g., an amount of braking input), accelerometers such as a 3-axis accelerometer 52E to detect roll, pitch, and yaw of the vehicle (e.g., to detect vehicle heading), wheel angle sensor 52G to detect an angle of the wheel 34; and steering wheel sensor 52J to detect an position (e.g., angle) of the steering wheel 54.

Sensors 52 may also include sensors to detect external characteristics of the vehicle surroundings and internal characteristics of vehicle 300. External environmental condition sensors may be included to detect distance and distance changes to external objects (e.g., distance to other vehicles, ground clearance, distance to external objects, and so on); temperature, pressure and humidity sensors to detect weather conditions; and other sensors to detect other external conditions. Image sensors can be used to detect, for example, the presence of lanes (e.g., by detecting lines in the road, curbing, medians, etc.), traffic signs, road curvature, obstacles, and so on. For example, sensors 52 include external condition sensors, such as but not limited to, proximity sensors 52F to detect and recognize objects and features in surrounding proximate to the vehicle and environmental sensors 52H to detect external environmental conditions, surrounding objects, and so on. The external environmental condition sensor may include or otherwise communicably coupled to (e.g., via wired or wireless communications via communication circuit 301) to image capturing and/or range detecting devices, such as but not limited to, cameras; radar, lidar, sonar, infrared sensors, to name a few (e.g., camera 114e, LIDAR 114f, radar 114c, etc. of FIG. 1).

Sensors 52 may also include sensors to detect internal conditions of the vehicle, for example, in the vehicle cabin (e.g., in-cabin). Internal environmental condition sensors may be included to detect objects and occupants present in the cabin (e.g., driver, occupants in front and/or rear seats, etc.); movement of occupants and extremities thereof; and other sensors to detect other internal conditions. For example, as shown in FIG. 3A, sensors 52 include internal condition sensors, such as but not limited to, gaze sensors 52I to detect status (e.g., open or closed in the case of eyes) and positions of an occupant's head and eyes (e.g., for head and eye tracking and gaze direction estimation). The internal condition sensors may include or otherwise communicably coupled to (e.g., via wired or wireless communications via communication circuit 301) to image capturing and/or range detecting devices, such as but not limited to, cameras; radar, lidar, sonar, infrared sensors, to name a few.

While the preceding described various example sensors, embodiments herein are not limited to only those sensors described, and additional/other sensors 52K can also be included as may be appropriate for a given implementation of vehicle 300. Furthermore, vehicle systems 320 may also provide vehicle-related data relevant to vehicle operation, characteristics, and dynamics to the vehicle data gathering circuit 310. For example, operation states of vehicle 300 (e.g., motor, engine, wheel angle, etc.) used by vehicle systems 320 may be supplied as vehicle-related data and/or used in conjunction with data collected by sensors 52.

Vehicle systems 320 can include any of a number of different vehicle components or subsystems used to control or monitor various aspects of the vehicle and its performance. In this example, the vehicle systems 320 include a global positioning system (GPS) or other vehicle positioning system 322; torque splitters 324 that can control distribution of power among the vehicle wheels such as, for example, by controlling front/rear and left/right torque split; engine control circuits 326 to control the operation of engine (e.g. Internal combustion engine 14); motor control circuits 328 to control operation of motor/generator (e.g., motor 32); heading control circuits 330 to control the direction of travel (e.g., the angle of wheels 34 and/or steering wheel 54); and other vehicle systems 332 (e.g., Advanced Driver-Assistance Systems (ADAS), such as forward/rear collision detection and warning systems, pedestrian detection systems, and the like).

As alluded to above, vehicle systems 320 may also provide vehicle-related data relevant to vehicle operation, characteristics, and dynamics to the vehicle data gathering circuit 310. For example, vehicle position system 322 may supply positional information; heading control circuit 330 may supply heading direction information; an ADAS system may supply hazard (e.g., obstacles, pedestrians, vehicles, etc.) detection; and the like. In some examples, data from the vehicle systems 320 may be used to derive vehicle-related data, for example, position and heading from vehicle systems 320 may be used to determine trajectory data.

Figure 3B:
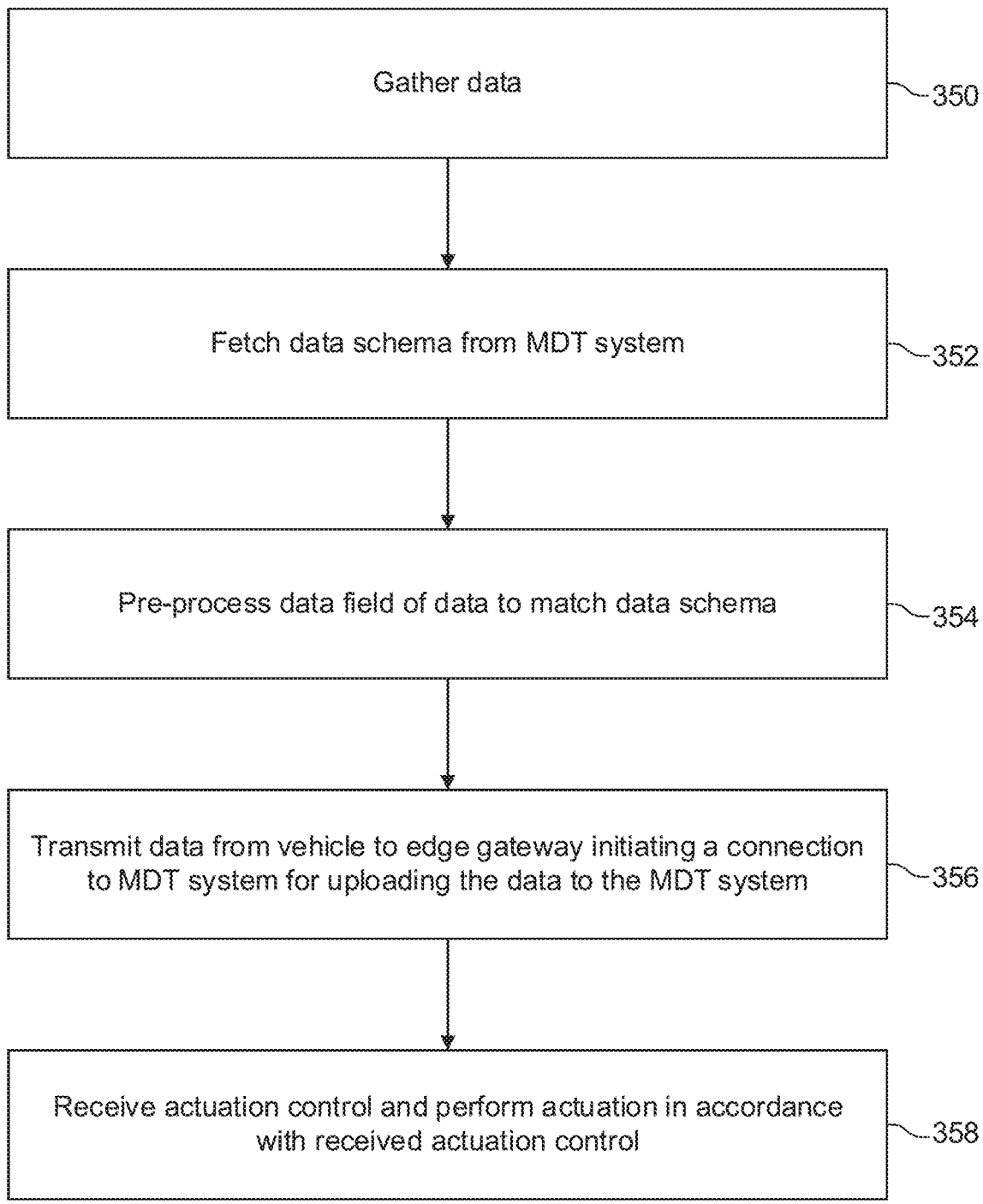
FIG. 3B is a flow chart illustrating example operations for uploading data to a mobility digital twin in accordance with embodiments of the disclosed technology.

Referring now to FIG. 3B, data (e.g., samples and measurements regarding operating conditions of a vehicle, e.g., vehicle actor 114, conditions of a driver of the vehicle, e.g., human actor 112, etc.) are gathered at operation 350. As discussed above, actors in the physical space 110 may comprise or be associated with sensors, monitoring devices and the like to obtain relevant data that can be used by or for a digital twin in digital space 120. For example, vehicle data gathering circuit 310, by way of communication circuit 301, can receive data from various vehicle sensors 52 and/or vehicle systems 320 (as well as V2I and V2V communications) regarding vehicle operating information (e.g., data), external environmental information, and/or in-cabin information (collectively referred to as vehicle-related data). Upon receipt of the aforementioned data and/or information, the data/information may be stored in memory 308, e.g., in a cache or buffer portion of memory 308. Decision circuit 303 may access memory 308 to analyze the received data/information to determine what data/information should be retained and/or transmitted to cloud devices, e.g., to digital space 120. In some embodiments, all gathered data can be transmitted to the digital space 120 and decision circuit 303 need not filter the gathered data to determine what is transmitted to the digital space 120 and what is not transmitted.

For example, decision circuit 303 receives vehicle-related data from sensors 52 and/or vehicle systems 302 and stores the received information as demonstration data set(s) 305 for transmission to digital space 120, in this example, to data lake 122a of vehicle digital twin 124. The sensors 52 may be sampled at any desired sampling rate while the vehicle is manually operated by a driver; for example, sensors 52 collect data every 1/100 of a second and are provided to the vehicle data gathering circuit 310 at the same rate. Each instance of sampling of vehicle-related data may be grouped together as a demonstration, for example, based on a time-stamp at which point the sampling of the vehicle-related data occurred. Any sampling rate may be used as desired, as long as the rate is high enough to capture the dynamics of the target object.

At operation 352, the relevant data schema from one or more digital twins intended to receive the data can be obtained. It should be noted that the data schema associated with different digital twins can vary. Data schemas can be different even between different ones of the same type(s) of twins. In some embodiments, digital space 120 determines where to send data received from physical space 110 (e.g., based on the aforementioned unique identifier(s)/correspondence between digital twin/physical actor or operation. Sending all gathered data to all digital twins can, in some scenarios/environments, require too much communication bandwidth and computing power (although doing so is still possible if so desired). A certain microservice of a digital twin can, for example, request the data from other digital twins based on that certain microservice's requirement(s), achieving the same result, i.e., any digital twin having access to any data of any physical actor/operation.

Upon receipt of the relevant data schema(s), decision circuit 303 may conform the data to match the data schema. For example, decision circuit 303 may pre-process a data field of the gathered data to match the fetched data schema at operation 354. As an example, consider a scenario where a human digital twin is being constructed/built to learn a specific driver's car-following behavior. Raw data collected from a vehicle operated by the driver, CAN bus, and radar sensors can be processed in accordance with the following steps: (1) calculate a time gap based on ego vehicle speed (from CAN bus), and a distance gap regarding a preceding vehicle (from radar measurements); (2) Filter out a segment(s) of data when such data is not generated during a car-following event, judging from the distance gap value (when larger than 100 m) and radar detection flag (when no object is detected). In this way, only relevant data in accordance with the requisite data schema need be sent to the human digital twin, that relevant data being car-following event data.

At operation 356, the vehicle may transmit the gathered data (as pre-processed according to the fetched data schema(s)), to digital space 120. In some embodiments, as illustrated in FIG. 3A, the vehicle data gathering circuit 310 may first transmit the data to an edge gateway 340 via communication circuit 301. The edge gateway 340 in turn may initiate a connection with the digital space 120 via communications layer 130. The gathered data can be tagged with or otherwise linked with an identifier associated with the vehicle actor 114/vehicle digital 124. For example, communications layer 130 may comprise the necessary software/hardware functionality/componentry to route data from a physical actor to an appropriate digital twin. As will be described below, AI or other appropriate techniques can be applied to the demonstration data set(s) to learn a digital twin model for the vehicle, i.e., vehicle digital twin 124, associated with the demonstration data set(s). Subsequent demonstration data (e.g., current vehicle-related data) may also be input into the digital twin model as observations. The subsequent demonstration data may be supplied in real-time as the most recent vehicle-related data.

As noted above, MDT system 100 can operate as an end-to-end framework, where data obtained in the physical space 110 can be communicated to and used by the digital space 120 by mobility digital twins to generate actuation controls that can be performed by the relevant actors in the physical space 110. Thus, at operation 358, actuation control(s) may be received and one or more actuations can be performed in accordance with the received actuation control. For example, in various embodiments, communication circuit 301 can be used to send actuation control signals (received from one or more mobility digital twins) to various vehicle systems 320 as part of controlling the operation of the vehicle, for example, based on application of the mobility digital twin on a current observation. For example, communication circuit 301 can be used to send vehicle operation inputs as signals to, for example, one or more of: motor controllers 326 to, for example, control motor torque, motor speed of the various motors in the system to control acceleration and/or declaration of the vehicle according to some control policy; ICE control circuit 326 to, for example, control power to engine 14 to, for example, to control acceleration and/or declaration of the vehicle according to the control policy; and/or brake pedal actuation, for example, to decelerate the vehicle according to the control policy.

The decision regarding what action to take via the various vehicle systems 320 can be made based on the information detected by sensors 52. For example, proximity sensor 52F may detect a lead vehicle at a distance from the vehicle 300. Decision circuit 303 may determine, based on application of the vehicle digital twin 124 that that the following distance should be increased so as to align with historical vehicle-following behavior of the driver (i.e., human actor 112). The communication circuit 301 may communicate control signals from the decision circuit 303 to control deceleration of the vehicle (e.g., reduce power output from engine 14, reduce motor speed of motor 32, and/or brake pedal actuation) to achieve a following distance according to the control policy. Similarly, the following distance may be reduced, lane-keeping may be maintained, AND/OR navigation/heading control may be determined according to the digital twin model to mimic driving styles and behaviors of the driver.

Returning to FIG. 3A, and with regard to FIG. 1, traffic digital twins, an example of which is traffic digital twin 126, are the digital replicas of traffic actors, such as infrastructures, which receive data from such infrastructure in the physical space 110. Such sampled data, like signal phase and timing, traffic count, and traffic flow, can be stored in the traffic data lake 126a for future reference. This sampled data can also be used for multiple traffic microservices in real time, such as traffic condition or flow monitoring 126b, variable speed limit 126c, routing and navigation 126d, ridesharing planning 126e, parking management 126f, and active road maintenance microservice 126g.

Similar to human digital twin 122 and vehicle digital twin 124, traffic digital twin 126 can be enhanced by the communication between the various digital twins. For example, routing and navigation microservice 126d can be carried out solely by the real-time traffic flow data sampled from camera/radar/loop detectors in the real world (physical space 110). However, they can be further enhanced if behavior preferences are set by human actor 112 and predictions are made by human digital twin 122 (e.g., a driver/passenger always goes to grocery stores when his/her commute route is highly congested). Additionally, if vehicle actor 112 detects that its fuel/battery level is low and sends that to vehicle digital twin 122, it can also assist the routing and navigation microservice 126d to find a gas/charging station near a user-preferred grocery store along the original route.

Figure 3C:
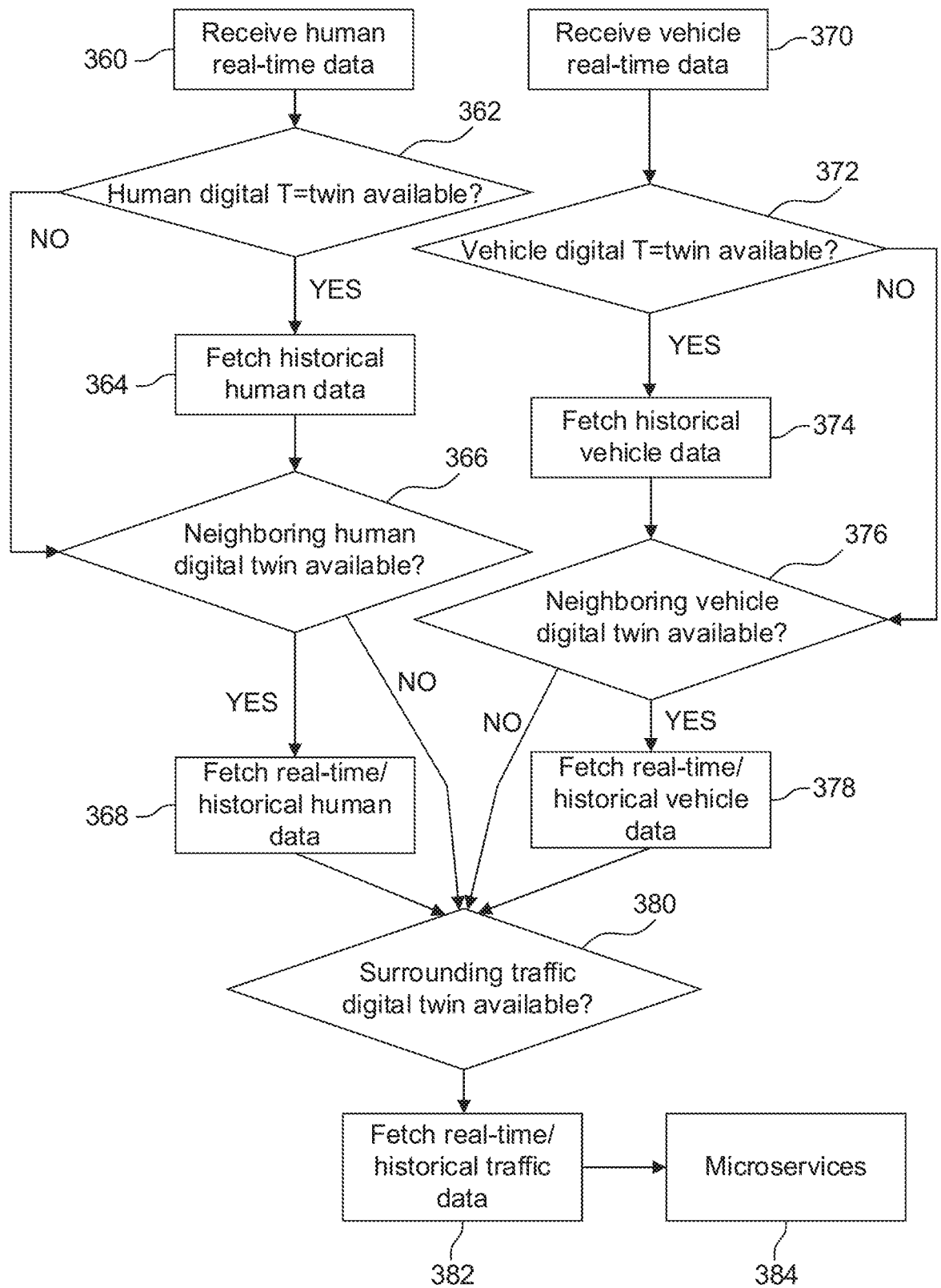
FIG. 3C is a flow chart illustrating example operations of a mobility digital twin in accordance with embodiments of the disclosed technology.

Referring now to FIG. 3C, at operations 360 and 370, real-time or current data associated with a human actor 112 and vehicle actor 114, respectively, may be received via communications layer 130 at digital space 120. For example, vehicle data gathering circuit 310 may receive sensor data from one or more of sensors 52 monitoring aspects of human actor 112, in this case, a driver of vehicle 100/300, and data from one or more sensors 52 monitoring the vehicle 100/300 itself. At operations 362 and 372, a determination is made regarding whether or not a corresponding mobility digital twin is available, respectively. In this context, checking availability can refer to determining whether or not a digital twin exists in digital space 120 to receive data from its corresponding physical actor/operation. For example, this check/determination process can be conducted by querying the license plate number of a vehicle (for human digital twin) and a model of the vehicle (for vehicle digital twin) in the cloud. If there are no records of these digital twins in the cloud, then it either means this particular driver/vehicle has no digital twin, or he/she/it does not want to disclose his/her/its digital twin to other parties. For physical/digital paring/synchronization, drivers can be associated to their vehicles license plate numbers (e.g., one embodiment of the aforementioned unique identifiers), while vehicles can be associated to their makes, models and years of manufacture.

If a corresponding mobility digital twin is available, that available mobility digital twin may, at operations 364 and 374, fetch historical data/information regarding the human actor and the vehicle itself from their respective data lakes, human data lake 122a and vehicle data lake 124a. For example, consider a scenario where again, the desire is to model the car-following behavior of a driver to design a personalized adaptive cruise control system for the vehicle he/she is driving. The model to be developed not only leverages the real-time data the driver is generating, but also the historical data generated by the driver from his/her past trips, so it can better learn the driver's behavior. If only based on the real-time data, the amount of data/samples might not be enough to accurately represent or be indicative of a driver's behavior(s), and the resulting prediction accuracy might also be compromised. Historical data can be updated with more current data, historical and real-time data can be used as verification mechanisms for one another, etc. If a corresponding mobility digital twin is not available, then a determination regarding whether or not neighboring human or vehicle mobility digital twins are available is made at operations 366 and 376, respectively. It should be understood that neighboring actors may have relevant data or information that can be helpful for a mobility digital twin to use/learn from, make predications, output actuation control instructions, etc. For example, neighboring entities, such as neighboring drivers in their respective neighboring vehicles may experience the same occurrence or event, such as a weather event, traversal of the same section of roadway, etc.

At operations 368 and 378, upon a determination that a neighboring human or vehicle actor are available, real-time as well as historical human and vehicle data are fetched, respectively. The manner in which real-time data may be obtained or fetched in the physical space 110 has been described above.

If neighboring mobility digital twins are not available, or upon fetching real-time/historical data regarding neighboring physical actors, a check is performed to determine if a surrounding traffic mobility digital twin is available at operation 380 akin to determining availability of a digital twin as described above. If no digital twins (neighboring or otherwise) are deemed to be available, as noted above, an assumption is made that no corresponding digital twin exists/a particular digital twin does not desire to receive data. In some embodiments, lack of digital twin availability may prompt construction of a new digital twin corresponding to the physical actor/operation source of the data (or a digital twin(s) willing to be discovered/available to receive such data).

If a surrounding traffic mobility digital twin is available, at operation 382, both real-time and historical data associated with the surrounding traffic can be obtained. That is, real-time data regarding the surrounding traffic and the environment can be obtained from road sensors, traffic signs, weather reports, for example. Historical data can be obtained from the traffic data lake 126a. Upon obtaining the relevant real-time/historical data regarding surrounding traffic conditions/characteristics, one or more microservices can be executed at operation 384. For example, based on the real-time and historical data, traffic digital twin 126 may execute traffic flow monitoring microservice 126b, generate or alter routing/navigation via routing and navigation microservice 126d, and so on. As noted above, upon execution of such microservices, corresponding actuation control instructions, signals, etc., can be transmitted back to the physical space 110/corresponding physical actor(s)/operation(s) as appropriate. That is, a digital twin microservice can request data from other digital twins as needed/desired, and those digital twins can then share microservice output with the corresponding physical actors/operations.

It should be noted that while FIG. 3C illustrates "parallel" operations between vehicle and human-related data gathering, such operations need not necessarily occur in parallel. For example, a particular mobility digital twin may not be available at the same time another mobility digital twin is available. For example, data/guidance from a certain digital twin can be stored on, e.g., a local machine of the physical actor (i.e., vehicle). When this digital twin is no longer available, its guidance/data will remain active for a certain period (based on the time sensitivity of the microservice), which can be aggregated with the guidance/data from other active digital twins.

Figure 4:
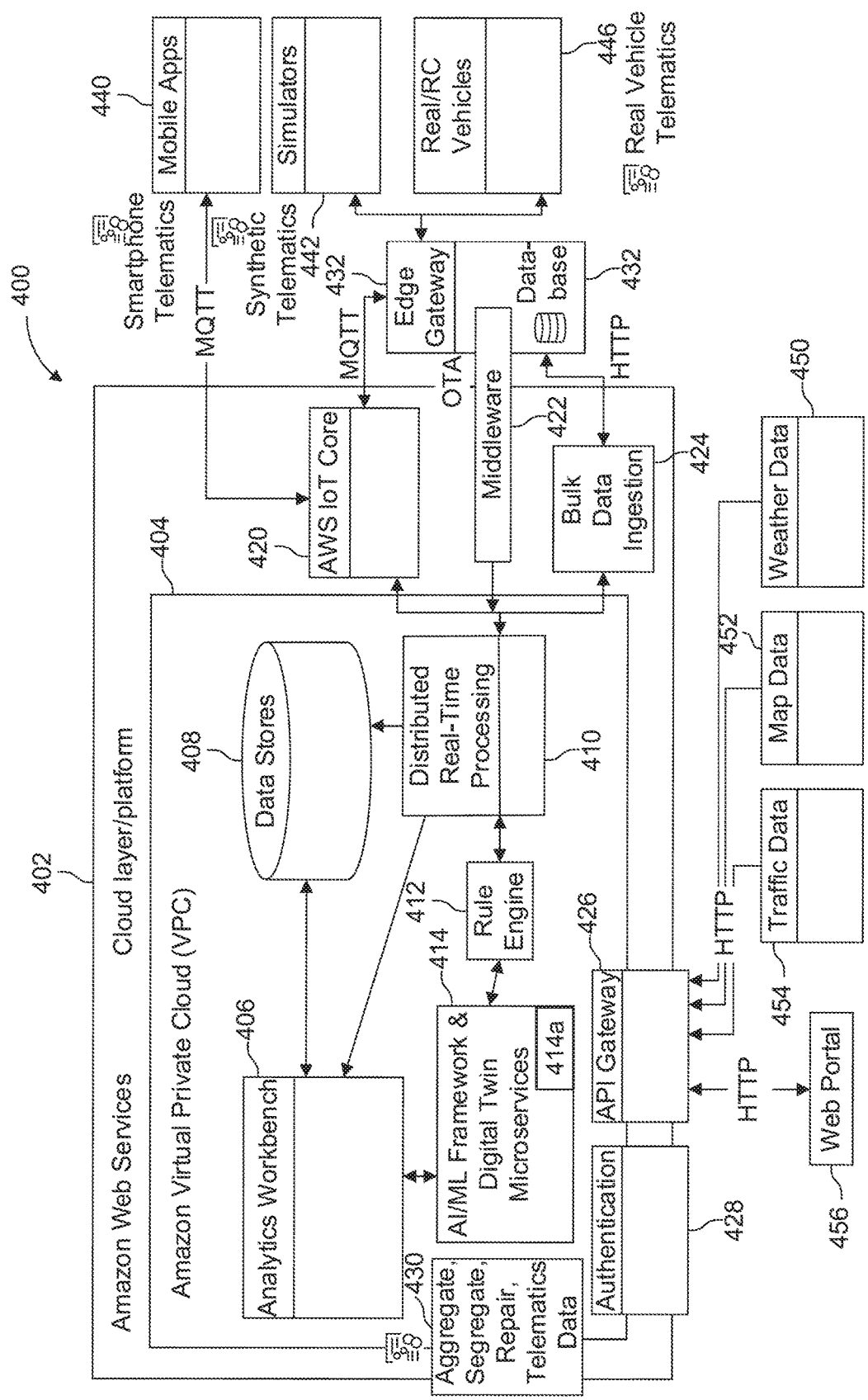
FIG. 4 illustrates an example cloud architecture with which a mobility digital twin system may be implemented to perform microservices including active road surface maintenance in accordance with embodiments of the disclosed technology.

FIG. 4 illustrates an example cloud architecture 400 on which MDT system 100 may be implemented. The cloud architecture 400 may be a data-driven platform for both real-time and bulk-batch ingestion, processing, and analytics. As shown in FIG. 4, cloud architecture 400 can be divided into three parts. A first part can comprise a cloud platform 402, while a second part can comprise a virtual private cloud 404 within cloud platform 402. It should be understood that those aspects/components of cloud architecture 400 that reside within cloud platform 402 may correspond to digital space 120 (FIG. 1). Those aspects/components that reside outside of the cloud platform 402 may be considered to correspond to the physical space 110 (FIG. 1). The edge/cloud architecture 400 which includes active road surface maintenance microservices 414a and others as described herein may be implemented by, e.g., Amazon Web Services (AWS), in which the active road surface maintenance is served as a microservice in Amazon Virtual Private Cloud (VPC); of course, implementations of the disclosed technology are not limited to AWS, and other cloud computing services, platforms, APIs, etc. can be used.

Cloud platform 402 may comprise the following components: analytics workbench 406, data stores 408, processing component(s) 410, which may be a distributed real-time processing component(s), a rule engine 412, and artificial intelligence (AO/machine learning (ML) AI/ML MDT microservices 414 which includes (among others, which may not be specifically shown as part of block 414) active road surface maintenance microservices 414a.

With distributed real-time processing, existing tools such Amazon® Elastic Kubernetes Service (EKS) (a service that builds, secures, operates, and maintains Kubernetes clusters, Kubernetes being an automated deployment, scaling, and management system for containerized applications), Apache Kafka® (a distributed event streaming platform that can be used for streaming analytics or real-time data feeds), and Apache Storm™ (a real-time distributed computation system) can be leveraged to provide real-time processing and analytics.

Analytics workbench 406 provides big data analytics functionality for analyzing data received from physical actors in physical space 110 or for analyzing historical data, e.g., from one or more digital twin data lakes. Analytics workbench 406 may comprise a distributed, scalable time-series database monitoring system, an example of which is OpenTSDB, which in turn is built atop Apache HBase™ which is an example of a non-relationship distributed database. This supports a writing rate of up to millions of entries per second, supports data storage with millisecond-level precision, and preserves data permanently without sacrificing precision. Such speed and precision data storage is useful in the context of MDT system 100 given the amount of data that can be generated by humans, vehicles, and traffic actors, not to mention communication layer 130's role to communicate between physical space 110 and digital space 120. As noted above, MDT system 100 can be used to generate actuation control signals for directing a vehicle's ADAS or ADS. In addition, Apache Spark™, a distributed processing system, may be used to conduct predictive analytics using a cloud-based big data platform (for large-scale distributed data processing, ML, etc.), such as Amazon EMR clusters.

Rule engine service 412 can be used to evaluate any rules configured for entities/actors (e.g., humans and vehicles) on the data received from an event queue (e.g., Kafka queue), and redirect it to AI/ML Framework & Digital Twin Microservices 414 based on the rule validation result. AI/ML Framework & Digital Twin Microservices 414 are the core of this cloud architecture, where end users are able to implement customized algorithms and applications with various objectives. This component can be used to process time-series data sent from the physical space 110 using statistical techniques, and send guidance back to the entities in the physical space 110. The data workflow can be triggered via Apache Airflow™, a workflow management platform, as one example. As noted above AI/ML Framework & Digital Twin Microservices 414 includes active road surface maintenance microservices 414a.

Data stores 410 can comprise, for example, a scalable storage infrastructure, an example of which is Amazon S3 to build each of the digital twin data lakes. Moreover, data stores 410 can comprise a database service that is purpose-built for JSON data to execute flexible, low latency queries to obtain a near real-time record of events in parallel on a massive scale, e.g., Amazon DocumentDB. Further still, data stores 410 can include a non-relational database and caching server that is highly replicated, such as Redis.

Outside VPC 404, but nevertheless resident within cloud platform 402, is an IoT core 420 which enables the connection between IoT devices (such as mobile applications, simulators, real vehicles, and remote controlled vehicles) and the cloud without a need to provision or manage servers. In other words, IoT core 420 may be a managed cloud service that allows connected devices to interact with cloud applications or other devices in the cloud. In some embodiments, IoT core 420 may supports various devices and messages, and can process/route those messages to cloud endpoints/devices reliably and securely. A bulk data Ingestion component 424 may also be included as part of cloud platform 402. Bulk data ingestion component 424 enables the ingestion of data (on the order of terabytes) in batch mode into appropriate MDT data lakes. Some scenarios where this component can be triggered are, e.g., at the end of vehicle trip, where bulk data ingestion is used to obtain all or some subset of data collected over some period of time/window. Additionally, bulk data ingestion component 424 may be used for periodic bulk data ingestion, event-triggered data ingestion, or in-vehicle data logging.

An authentication service 428, such as OpenID Connect, may be used as a simple identity layer on top of an authorization protocol, which is adopted to verify the identity of end users based on the authentication performed by an authorization server (not shown), as well as to obtain the basic profile information about end users. An application programming interface (API) gateway 426 may be a cloud-managed service used to create, publish, maintain, monitor, and secure APIs at any scale. The API gateway 426 acts as a "front door" for applications to access data or functionalities from any backend services provided via cloud platform 402.

Outside of cloud platform 402, external data sources can be leveraged to enrich the functionalities of cloud microservices. For example, traffic data 454, map data 452, and weather data 450 may be integrated into API gateway 426 via HTTP. With such data, more microservices can be deployed in, e.g., a traffic digital twin, such as traffic digital twin 126, and hence provide better guidance towards humans and vehicles in the physical space 110, e.g., human actor 112 and vehicle actor 114. Some embodiments utilize active road maintenance system or microservice 126g deployed in traffic digital twin 126 and can access traffic data lake 126a, for example. Additionally, a web portal 456 is designed to visualize the digital processes on the cloud, and enable end users to create and modify microservices, such as those associated with the various mobility digital twins.

Example data sources are shown in FIG. 4, which stand for the human, vehicle, and traffic actors 112, 114, and 116, respectively in physical space 110 of MDT system 100. Mobile applications 440 are typically designed for both Android and iOS, where end users' position and speed data, for example (measured by GPS and gyroscope sensors) can be uploaded to IoT Core 420 via MQTT (Message Queuing Telemetry Transport), which is a publish-subscribe protocol used to transmit messages between devices. Additionally, a customized edge gateway 432 allows external simulators 442 (such as SUMO and Unity), and real vehicles and remote controlled vehicles 446 (with ROS2 embedded) to exchange messages with IoT Core 420 via MQTT.

Systems and methods are provided herein for effectuating a mobility digital twin framework/system that can be implemented in the cloud and have the ability to ingest different types of data, e.g., vehicle-related data, simulations, scaled down vehicles, as opposed to just data from different sources (as is typically the case in conventional digital twin systems). Moreover, with this functionality comes the ability to, when warranted, integrate such data in unique ways, e.g., to substitute simulated/scaled-down versions of data for missing data, bad data, or real word data. Following the example, remote controlled cars can be used as a scaled down alternative to gather relevant data that can be used for scaling decisions, for example. Moreover, data can be aggregated, segregated, or repaired as needed via, e.g., Aggregate, Segregate, Repair, Telematics Data Service 430. Thus MDT system 100 has the ability to deal with real world idiosyncrasies without compromising the quality of service end users might otherwise experience, and any compromises on safety due to faulty data.

It should be understood that the components, mechanisms, and the like disclosed herein that make up cloud architecture 400 are non-limiting examples. Those having ordinary skill in the art would know alternative components or mechanisms that could also be used in accordance with embodiments of the disclosed technology.

As noted above, the disclosed technology in accordance with some embodiments is directed to an active road surface maintenance system developed for connected vehicles with the aid of the MDT framework 100. Embodiments of the disclosed technology provide guidance to connected vehicles in a proactive way. Sensing technology (such as, e.g., sensors 50) that may be equipped for example on pedestrians, vehicles, and roads themselves provide road surface and other quality data to the MDT on the cloud, where machine learning algorithms use these data to assess conditions of road surfaces or predict future road conditions and model the "road digital twins." Guidance information is then generated by such road digital twins and sent back to connected vehicles in the real world, thereby assisting them to drive in a certain way to avoid excessive loads on certain areas of the road surface. In some embodiments, the actuation process of the vehicle is conducted via traveling on a route or trajectory that avoids surface lanes that have a greater need for maintenance, as described further herein.

As also noted above, the example MDT framework/system 100 of FIG. 1 in accordance with some embodiments of the present disclosure includes traffic digital twin 126 which is a digital replica of traffic actors, such as infrastructures, that receive data from such infrastructure in the physical space 110. Such sampled data can be stored in the traffic data lake 126a for future reference. This sampled data can also be used for multiple traffic or road microservices in real time, such as active road maintenance 126g. The active road maintenance microservice 126g as implemented, for example, by the MDT framework 100 can provide an active road surface maintenance system or road digital twin with regard to connected vehicles.

Figure 5:
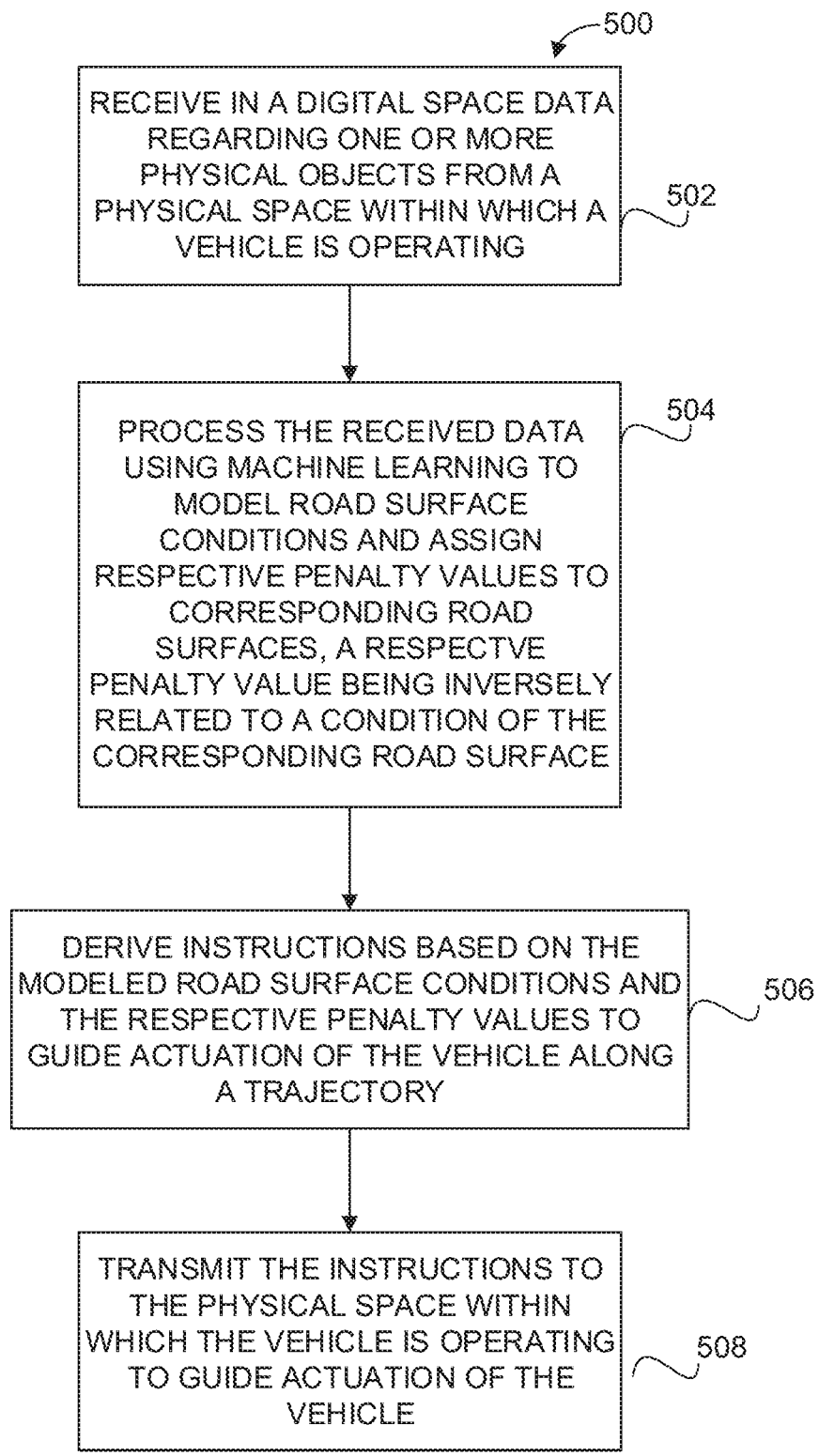
FIG. 5 is a flowchart that illustrates a process for providing an active road maintenance microservice through a MDT framework, according to one embodiment of the disclosed technology

The active road surface maintenance system or microservice 126g can leverage the information collected from the MDT framework 100. FIG. 5 is a flowchart that illustrates a process 500 for providing an active road maintenance microservice through a MDT framework such as MDT framework 100, according to one embodiment of the disclosed technology. The active road maintenance microservice can be implemented in the digital space 120, such as in traffic digital twin 126, as active road maintenance microservice 126g (FIG. 1) or 414a (FIG. 4.). The active road maintenance microservice 126g can use road surface data or other vehicle data (from ego or neighboring vehicles), human data (from drivers, passengers, pedestrians, bikers, etc.), or traffic data (from traffic signs, etc.). This data can be collected or obtained from sensors 52 associated with one or more physical objects such as human actor 112, vehicle actor 114, or traffic actor 116 of the physical space 110, as described further herein. Real-time or historical data obtained from sensors 52 can be stored in traffic data lake 126a for access by active road maintenance microservice 126g, which can act as a road digital twin. Communication between the one or more physical objects of the physical space 110 and the digital twins of the digital space 120 can be effected through communications layer 130.

At operation 502, data regarding one or more physical objects from physical space 110 connected to a vehicle is received in digital space 120 by a mobility digital twin such as traffic digital twin 126. The data may be collected by one or more sensors 52 communicating with the one or more physical objects. The sensors can be equipped on one or more of roads, vehicles, vehicle occupants, pedestrians, bikers, etc. The sensors can be one or more of perception sensors, ultrasonic sensors, cameras, radar, LIDAR, in-pavement surface temperature and condition sensors, in-pavement surface chemical and concentration sensors, wearable devices, road surface sensors, in-cabin sensors, mobile apps, loop detectors, condition sensors, etc.

The received data can be stored in a data lake such as traffic data lake 124a, and can be used by the active road maintenance microservice 126g. This data may be real-time information relating to one or more of the following: road surfaces, traffic flow, weather, ego vehicle, perception of neighboring vehicle, occupants of ego vehicle, etc. Accordingly this data may be road surface data or other vehicle data (ego or neighboring vehicles), human data (e.g., drivers, passengers, pedestrians, bikers), or traffic data obtained from sensors 52 associated with one or more physical objects such as human actor 112, vehicle actor 114, or traffic actor 116.

Accordingly, the received data stored in the traffic data lake 126a and processed by active road maintenance microservice 126g may be real-time data or historical data obtained from sensors 52. A fusion process can be applied to the received data, and noisy data can be filtered out. The fusion process may be effected using a Kalman filter-based sensor fusion algorithm.

At operation 504, the received data is processed using machine learning to model road surface conditions, in which respective penalty values are assigned to corresponding road surfaces, a respective penalty value being inversely related to a condition of the corresponding road surface, i.e., a respective penalty being higher the lower a condition of the corresponding road surface. In some embodiments the respective penalty values can be converted into respective rewards values using a rewards function, a respective rewards value being higher the higher a condition of the corresponding road surface.

In some embodiments the received data at operation 504 including historical data or other data obtained from sensors 52 is processed using machine learning to model road surface conditions and predict future conditions of roads or lanes such as how soon a specific section of the road or lane may crack, become slippery, develop potholes, need fresh lines painted, etc. Respective penalty values may be assigned to corresponding road surfaces, a respective penalty value being inversely related to a condition of the corresponding road surface.

At operation 506, instructions are derived based on the modeled road surface conditions and the respective penalty values to guide actuation of the vehicle along a trajectory. In some embodiments using a rewards function, the rewards function can be optimized in designing or deriving the trajectory. (Optimization is discussed further below.) In any event the trajectory can be derived taking into account the conditions of road surfaces or lanes which is a factor that can be assigned a certain priority in deriving the trajectory.

In some embodiments at operation 506, predicted future conditions of road surfaces or lanes and/or the respective penalty/rewards values can be used to target or identify road surfaces or lanes for maintenance.

At operation 508 the instructions are transmitted to the physical space 110 connected to the vehicle to guide actuation of the vehicle. When the vehicle is an autonomous vehicle or is otherwise operating in a self-driving mode rather than a manual mode, actuation of the vehicle can be effected along the trajectory. When the vehicle is a non-autonomous vehicle, or is an autonomous vehicle operating in a manual mode, i.e., being driven by a human, the human driver can be prompted to drive along the trajectory when the vehicle is operated by the human driver. When the vehicle is operated by a human driver, each respective road or lane of the road surfaces along the trajectory can be displayed with an indicator that indicates the road surface conditions of the respective road or lane, as further described below.

In some embodiments at operation 508 information regarding the road surfaces or lanes targeted for maintenance can be delivered to a dedicated location such as a server.

Figure 6:
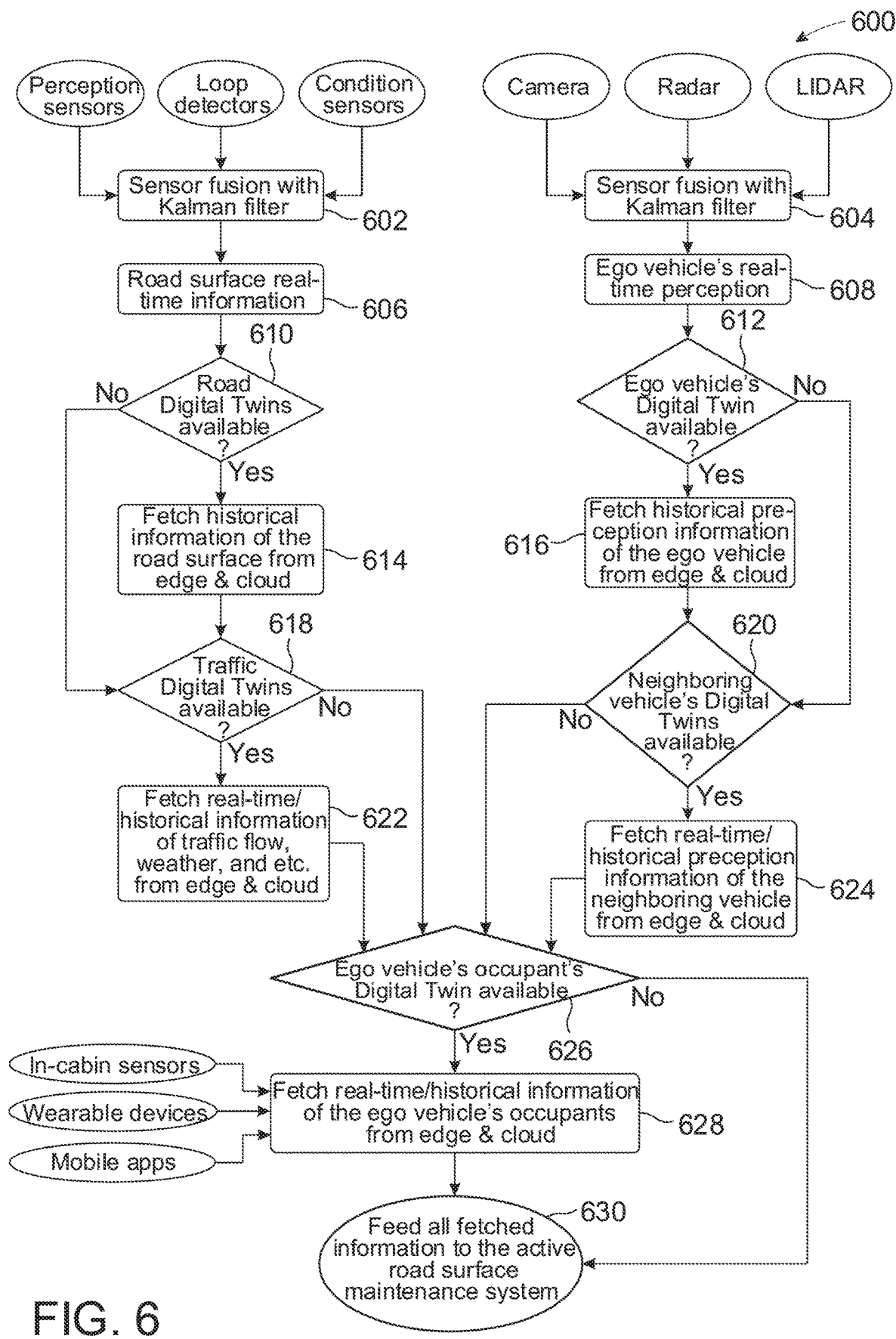
FIG. 6 is a flowchart that illustrates a process for collecting data for an active road maintenance system or microservice through a MDT framework, according to one embodiment of the disclosed technology.

FIG. 6 is a flowchart that illustrates a process 600 for collecting data for active road maintenance system or microservice 126 through the MDT framework 100, according to one embodiment of the disclosed technology. As shown in FIG. 6 data inputs into the system can include but are not limited to sensors 52 such as perception sensors, loop detectors, condition sensors, camera, radar, LIDAR, in-cabin sensors, wearable devices, or mobile apps. Road surface monitoring can be effected through traffic infrastructures, examples of which include but are not limited to an in-pavement surface temperature and condition sensor, an in-pavement surface chemical and concentration sensor, a roadside monitoring camera, etc. Accordingly, various sensing technologies on traffic infrastructures are able to provide actionable information pertaining to road surfaces to the MDT framework 100. Such sensors may be installed for example in a roadway and can measure the surface temperature and surface condition as, e.g., dry, wet, ice watch, chemically wet, etc. Such sensors can also collect real-time surface data that can be used for example to optimize maintenance operations and increase the effectiveness of surface treatments, which are handled by the actuation part of the disclosed technology.

As an example on the vehicle side, a mobile application executed on a mobile device such as a smart phone can use its camera to monitor the condition of various road surfaces, in which built-in monocular depth estimation algorithms are able to identify potholes and other crevices in real time. In this way road surface perception can be accomplished through a camera sensor mounted on the ego vehicle. A real-time monitoring system running on a mobile device or phone using its camera can act as a monitoring system for detecting potholes. Images can be presented showing, for example by color coding or some other indicator, potholes or other crevices in the road. This can be accomplished using, e.g., monocular cameras, multiple cameras, LIDAR, etc. A mobile application such as 440 of FIG. 4 can upload the data to IoT Core 420 via MQTT. Customized edge gateway 432 allows external simulators 442 (such as SUMO and Unity), and real vehicles and remote controlled vehicles 446 (with ROS2 embedded), to exchange messages with IoT Core 420.

Returning now to FIG. 6, at operations 602 and 604, real-time or current data associated with a vehicle actor 114 or traffic actor 116 (refer to FIG. 1) received from one or more sensors 52 monitoring aspects of the vehicle 100/300 or traffic is fused together. Such data may be sensed using one or more of perception sensors, loop detectors, condition sensors, a camera, radar, LIDAR, or others. As to fusion, once the data is collected through one or more sensing technologies, a sensor fusion process is applied to improve the perception accuracy of the road surface condition. Given different real-world scenarios, such as various weather, traffic conditions, and sensor placement, a certain amount of noisy data may be generated by the perception sensors that may not accurately measure the road surface. In this case, a Kalman filter-based sensor fusion algorithm, for example, can be applied to filter out the noisy data and maintain the more accurate data.

At operations 606 and 608 real-time road surface information and the ego vehicle's real-time perception are output after the Kalman filter-based sensor fusion algorithm has been applied to the raw perception data, respectively.

At operation 610 it is determined whether a corresponding road digital twin is available, e.g., whether historical information of particular road surfaces is stored in the edge/cloud architecture 400 such as in traffic data lake 126a. A road digital twin can be embodied by, e.g., active road maintenance microservice 126g within traffic digital twin 126 that accesses traffic data lake 126a as shown in FIG. 1. Active road maintenance microservice 126g can be implemented, e.g., within the AI/ML framework and digital twin microservices 414 as represented by 414a of FIG. 4. As noted above, FIG. 4 illustrates an example cloud architecture 400 on which MDT system 100 may be implemented. Block 414 is part of cloud platform 402 that may correspond to digital space 120 of FIG. 1. It is of course to be understood that the implementations shown in FIGS. 1 and 4 are just examples and that the disclosed technology including the "road digital twin" supported by active road maintenance microservices 126g and 414a can be implemented in other ways as well.

If at operation 610 road digital twin 126g is not available then at operation 618 it is determined whether a traffic digital twin 126 is available. If on the other hand at operation 610 road digital twin 126g is available then at operation 614 historical information of the road surface is fetched from edge/cloud architecture 400 as shown in FIG. 4 (e.g., from traffic data lake 126a storing information received from sensors 52 or other data lakes, etc.). It is then determined at operation 618 whether a traffic digital twin 126 is available. If at operation 618 a traffic digital twin 126 is available then at operation 622 real-time/historical information of traffic flow, weather, etc., is fetched from edge/cloud architecture 400 as shown in FIG. 4, and then at operation 626 it is determined whether the ego vehicle's human digital twin 122, covering any occupant of the ego vehicle, is available. If on the other hand at operation 618 traffic digital twin 126 is not available then at operation 626 it is determined whether the ego vehicle's human digital twin 122, covering any occupant of the ego vehicle, is available.

Meanwhile, at operation 612 it is determined whether the ego vehicle's corresponding digital twin 124 is available. If the ego vehicle's digital twin 124 is not available then at operation 620 it is determined whether the neighboring vehicle's corresponding digital twin is available. If on the other hand the ego vehicle's digital twin 124 is available then at operation 616 historical perception information of the ego vehicle is fetched from edge/cloud architecture 400.

If at operation 620 the neighboring vehicle's digital twin is not available then at operation 626 it is determined whether corresponding digital twin(s) are available pertaining to the ego vehicle's occupant(s). If on the other hand at operation 620 the neighboring vehicle's digital twin is available then at operation 624 real-time/historical perception information of the neighboring vehicle is fetched from edge/cloud architecture 400. Following, at operation 626 it is determined whether digital twin(s) are available pertaining to the ego vehicle's occupant(s).

At operation 628 real-time/historical information of the ego vehicle's occupant(s) are fetched from the edge/cloud architecture 400. This information may come from one or more sources including but not limited to in-cabin sensors, wearable devices, mobile apps, etc.

Figure 7:
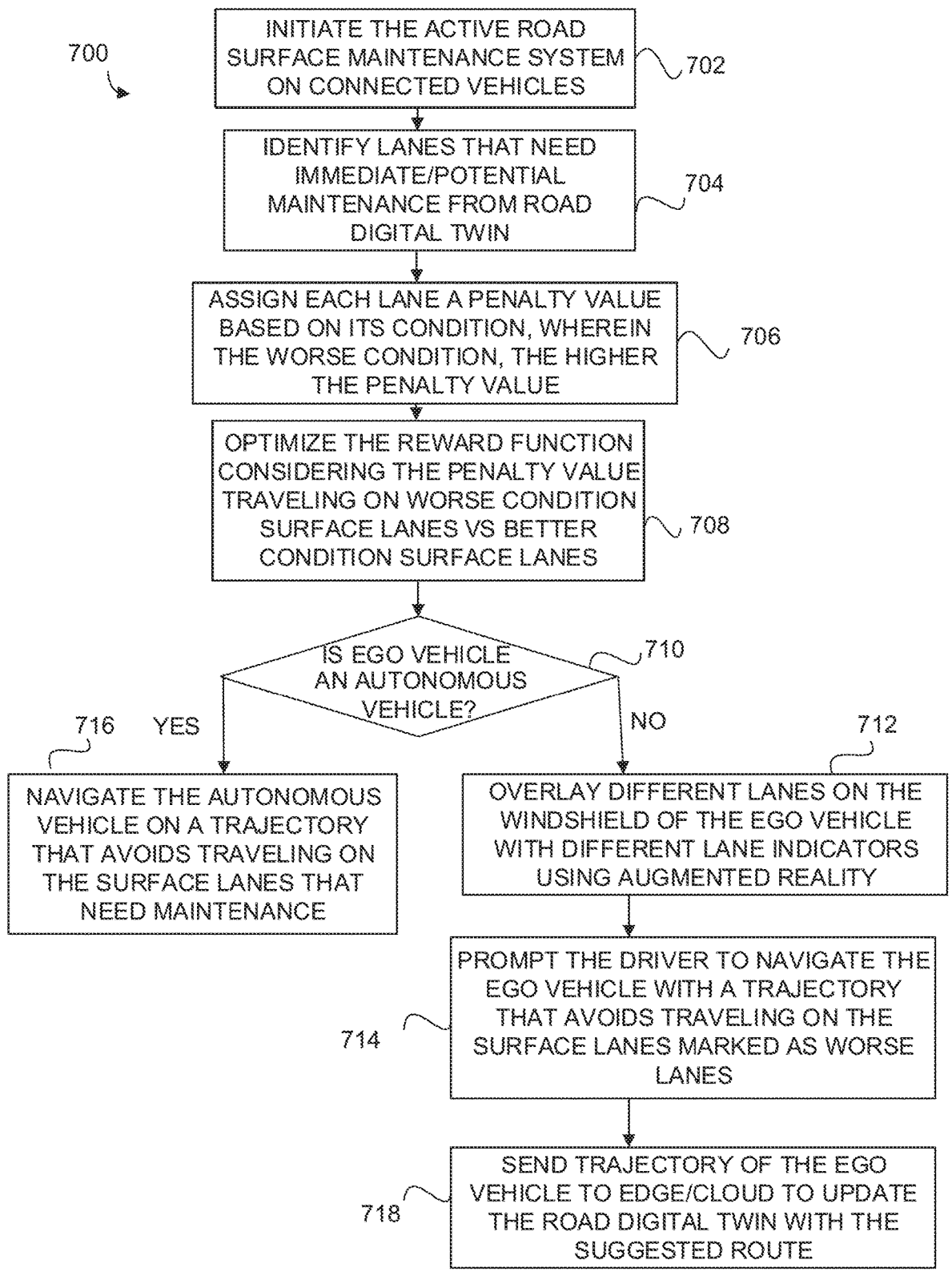
FIG. 7 is a flowchart illustrating example operations for active road surface maintenance for both human-driven connected vehicles and autonomous connected vehicles, according to one embodiment of the disclosed technology.

At operation 630 all fetched information is fed to the active road surface maintenance system or road digital twin 126g, where further processing and modeling is performed as set out for example in FIG. 7 in order to enable the actuation piece of the MDT framework 100 to function. The active road surface maintenance system or road digital twin 126g is designed for connected vehicles that can transmit data with the MDT framework 100 through the communication layer 130. Upon obtaining the relevant real-time/historical data, one or more microservices can be executed. For example, based on the real-time and historical data, traffic digital twin 126 may execute active road service maintenance microservice 126g to assess current road conditions in advance planning a partial or entire route or model/predict (using machine learning) current or future road surface conditions and generate or alter routing/navigation via routing and navigation microservice 126d, and so on, in order to guide vehicles to roads or lanes that are in better condition while avoiding roads or lanes that are in worse condition. As noted above, upon execution of such microservices, corresponding actuation control instructions, signals, etc., can be transmitted back to the physical space 110/corresponding physical actor(s)/operation(s) as appropriate. That is, a digital twin microservice can request data from other digital twins as needed/desired, and those digital twins can then share microservice output with the corresponding physical actors/operations.

In the context of determining whether corresponding mobility digital twins are available as per operations 610, 612, 618, 620, and 626 of FIG. 6 (e.g., corresponding road digital twin 126g, traffic digital twin 126, ego vehicle's digital twin 124, neighboring vehicle's digital twin, ego vehicle's occupant(s)' digital twin), in some embodiments checking availability can refer to determining whether or not a digital twin exists in digital space 120 to receive data from its corresponding physical actor/operation or from a physical actor/operation that otherwise provides data to the particular digital twin. For example, this check/determination process can be conducted by querying the license plate number of a vehicle (for a human digital twin) and a model of the vehicle (for a vehicle digital twin) in the cloud. If there are no records of these digital twins in the cloud, then it means either that this particular driver/vehicle has no digital twin, or that he/she/it does not want to disclose his/her/its digital twin to other parties. For physical/digital paring/synchronization, drivers can be associated to their vehicles license plate numbers (e.g., one embodiment of the aforementioned unique identifiers), while vehicles can be associated to their makes, models and years of manufacture.

If a corresponding mobility digital twin is available, that available mobility digital twin may, at operations 614, 616, 622, 624, and 628 fetch historical data/information regarding the human actor(s) and the relevant vehicle(s) from their respective data lakes, human data lake 122a, vehicle data lake 124a, and traffic data lake 126a. For example, consider a scenario in which the desire is to model the conditions of a road surface using traffic and weather conditions, historical information of the road surface, real-time/historical information of traffic flow and weather, historical perception information of the ego vehicle, real-time/historical perception information of neighboring vehicle(s), and real-time/historical information of the ego vehicle's occupants, in order to assess current conditions of roads/lanes and predict future conditions of roads/lanes and design a personalized route or trajectory for an autonomous vehicle or self-driving mode or for a non-autonomous vehicle or manual driving mode. The model to be developed can not only leverage the real-time data being generated, but also historical data. If only based on the real-time data, the amount of data/samples might not be enough to accurately represent or be indicative of, e.g., ego or neighboring vehicles, and the resulting prediction accuracy might also be compromised. Historical data can be updated with more current data, historical and real-time data can be used as verification mechanisms for one another, etc. It should be understood that neighboring actors may have relevant data or information that can be helpful for a mobility digital twin to use/learn from, make predications, output actuation control instructions, etc. For example, neighboring entities, such as neighboring drivers in their respective neighboring vehicles, may experience the same occurrence or event, such as a weather event, traversal of the same section of roadway, etc.

It is noted that the manner in which real-time data may be obtained or fetched in the physical space 110 has been described above. Further, if a digital twin being searched for is not available, an assumption is made that no corresponding digital twin exists or a particular digital twin does not desire to receive data or another reason. In some embodiments, lack of digital twin availability may prompt construction of a new digital twin corresponding to the physical actor/operation source of the data (or a digital twin(s) willing to be discovered/available to receive such data).

It should also be noted that while FIG. 6 illustrates "parallel" operations between road surface, traffic flow, weather, and vehicle and human-related data gathering, such operations need not necessarily occur in parallel. For example, a particular mobility digital twin may not be available at the same time another mobility digital twin is available. For example, data/guidance from a certain digital twin can be stored on, e.g., a local machine of the physical actor (i.e., vehicle). When this digital twin is no longer available, its guidance/data will remain active for a certain period (based on the time sensitivity of the microservice), which can be aggregated with the guidance/data from other active digital twins.

It is also noted that the precise order of various operations presented in FIGS. 5-7 may not necessarily be important, and that the order of various operations may be changed while still falling within the scope of the disclosed technology.

It is also noted that real-time data regarding traffic and the environment can be obtained from road sensors, traffic signs, weather reports, or from other sources. Historical data can be obtained from the traffic data lake 126a, for example.

FIG. 7 is a flowchart that illustrates operations or a process 700 for active road surface maintenance for human-driven connected vehicles and/or autonomous connected vehicles, according to an embodiment of the disclosed technology. The process 700 may be performed, e.g., by an active road surface maintenance microservice or system such as active road surface maintenance microservice 126g. As noted above active road maintenance microservice 126g can be implemented, e.g., within the AI/ML framework and digital twin microservices 414 as represented by 414a of FIG. 4, or in other ways.

At operation 702 an active road surface maintenance system is initiated on connected vehicles. As part of this operation the information fetched from a process such as the process of FIG. 6 (see, e.g., operation 628 of FIG. 6) is received by the active road surface maintenance system 126g.

At operation 704 lane(s) that need immediate/potential maintenance from the MDT 100 or road digital twin 126g are identified. This identification can be made using the information received at operation 702, including information received from sensors 52. This information can include road surface real-time information, real-time/historical information of traffic flow, weather, historical perception information of the ego vehicle, real-time/historical perception information of neighboring vehicle(s), real-time/historical information of occupant(s) of the ego vehicle, etc.

At operation 706 each lane is assigned a penalty value based on its condition; for example, the worse the condition of a lane, the higher the penalty value the lane is assigned. Penalty values corresponding to different respective surface lanes are calculated and assigned based on the road surface condition of each respective road or lane or the urgency of each respective road or lane to get maintained. In one non-limiting example the penalty is calculated as a function of multiple factors of the road surface, shown in the following formula provided in Equation (1):

$$\text{Penalty} = f\{\text{boggy, bulldust, variance, corrugation, floodway, loose, hole, rough, rutting, slippery, dry, stream crossing, washout, etc.}\} \quad (1)$$

The factors in Equation (1) that potentially affect or create road surface conditions are described in more detail below.

In any event, based on the penalty value calculated in Equation (1), a rewards function calculates a reward for traveling on each respective surface lane: the better condition the lane is, the higher the reward the lane will have. For autonomous connected vehicles, the road digital twin 126g can generate a route or trajectory of the vehicle considering this reward (while meeting safety criteria), so that the lane with a better condition will be recommended for travel with one aim being to make that lane more likely to be traveled than a lane with a worse condition. This can in turn benefit the maintenance of the road surface and extend its lifespan.

Accordingly the penalty values enable the MDT 100 or road digital twin 126g to assign lanes using a rewards function by recommending an actuation result for the vehicle (i.e., suggesting a route) that has an optimal "rewards" value, taking into account that lanes with better conditions have lower penalty values. Thus the lower the penalty value the higher the rewards value and the more optimal the route is.

At operation 708 road digital twin 126g optimizes the rewards function considering the relative penalty values of traveling on bad-condition surface lanes vs. better or good-condition surface lanes. Optimizing the rewards function or optimizing the rewards value can be accomplished in various ways. In one example, optimizing the rewards value can mean prioritizing avoiding traveling on roads or surface lanes that need maintenance, with the roads or surface lanes that need more maintenance being prioritized more in avoidance. In another example optimizing the rewards value can mean factoring the rewards value in to the route or trajectory determination along with one or more other factors (such as duration of trip, time of day, safety, avoiding highways, etc.). In another example optimizing the rewards value can mean increasing or maximizing the total rewards value, or decreasing or minimizing the total penalty value. These examples are of course not limiting. In some embodiments an overall priority value can determine the general priority of road/lane avoidance vs other factors.

At operation 710 it is determined whether the ego vehicle is an autonomous vehicle or is in a self-driving mode. If YES then at operation 716 the autonomous vehicle is navigated with a trajectory that optimizes the rewards value, e.g., prioritizes avoiding traveling on the surface lanes that need maintenance. If on the other hand it is determined at operation 710 that the ego vehicle is not an autonomous vehicle or not in self-driving mode and is instead operated by a human driver in manual mode, then at operation 712 different lanes are overlayed on the windshield of the ego vehicle with different colors (or non-color markings) using augmented reality, to guide the driver on a route or trajectory that optimizes the rewards value.

Thus for human-driven connected vehicles, at operation 712 a unique visualization method is presented, to visualize the guidance to the human driver through an augmented reality (AR)-based heads-up display (HUD). Particularly, if the rewards value of a particular lane is higher (namely, the penalty value is lower), the respective lane will be overlaid with a greener band. If the rewards value of a particular lane is lower (namely, the penalty value is higher), the lane will be overlaid with a redder band.

At operation 714 the human driver is prompted to navigate the ego vehicle with a trajectory that optimizes the rewards value, e.g., that can avoid traveling on the surface lanes with higher penalty values. At operation 718 the trajectory of the ego vehicle is sent to the edge/cloud architecture 400 of FIG. 4 to update the road digital twin 414a with the recommended or suggested route.

Figure 8:
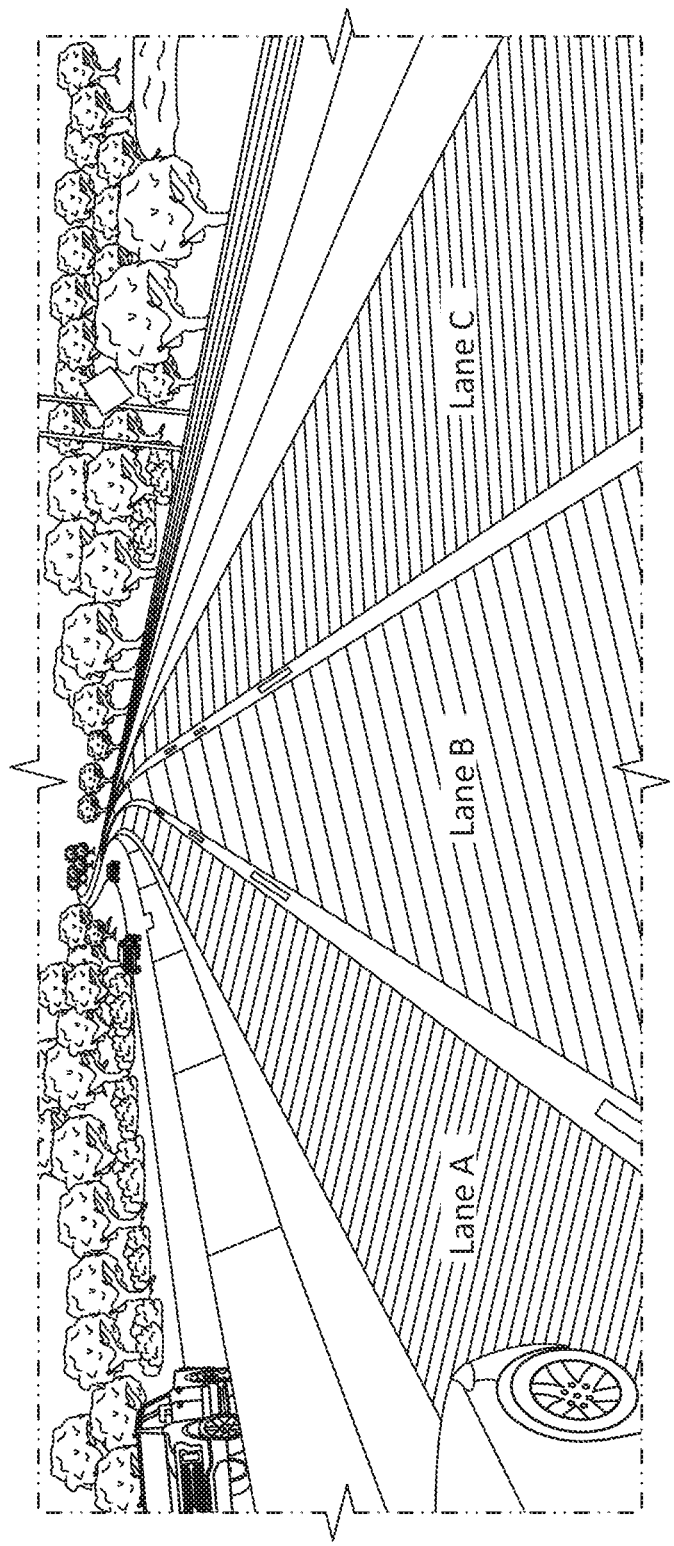
FIG. 8 illustrates a lane indicator scheme in an augmented reality based heads-up display design for a human driver, according to one example embodiment of the disclosed technology.

It is noted that lanes with higher penalty values can be indicated in various ways such as by using text (e.g., "bad condition," "fair condition," "good condition," putting an "X" over a bad condition lane, etc.,), or by using voice, a color coding scheme, or others. FIG. 8 shows such a lane indicator or coding scheme in an augmented reality based heads-up display design 800 for a human driver, according to an example embodiment. As can be seen in FIG. 8, the rightmost lane "Lane C" in this example has a higher rewards value (lower penalty value) represented by a distinct marking (in some embodiments not shown this could for example be green), and the leftmost lane "Lane A" has a lower rewards value (higher penalty value) as represented by a different distinct marking (in some embodiments not shown this could for example be red). The center or middle lane "Lane B" has a medium rewards value (medium penalty value) as represented by still another distinct marking (in some embodiments not shown this could be for example blue or gray). Accordingly the human driver can be prompted by the augmented reality based heads-up display to avoid the leftmost lane that has been assigned a high penalty value and a low rewards value due to its poor road surface condition. It is of course to be understood that any colors could be chosen for the display design.

Accordingly, as shown in the example of FIG. 8, this AR-based HUD design can be perceived from the driver's field of view. Since the leftmost lane "Lane A" has the worst condition and needs maintenance (based on its rewards value), the leftmost lane can be shown to the human driver as a red color to visually suggest to the driver not to enter. The middle lane "Lane B" has a moderate condition with an average rewards value, and so it can be shown as a plain color. The rightmost lane "Lane C" has the best condition with a high rewards value, and so it can be presented for visualization as a green color to encourage the driver to enter. Of course these colors are just examples.

It is noted with regard to overall route or trajectory design that factors affecting the condition of road surfaces can be prioritized higher or lower amongst other route design factors, such as driving time, distance, time of day, driver speed preferences, type of road (e.g., highways, back roads), the vehicle's destination, downstream traffic conditions, etc. Accordingly the proposed route or trajectory developed by the road digital twin 126g can also serve as a suggestion considering such other aspects of driving, so that the output can be more rational and practical, instead of considering only the maintenance of the road surface. All of these other aspects can be enabled with the MDT framework 100 described in the present disclosure.

As noted above, further to operation 706, penalty values corresponding to different respective surface lanes are assigned based on the road surface condition of each respective road or lane or the urgency of each respective road or lane to get maintained.

Factors affecting road surface condition such as those noted above in Equation (1) are now further described using the following non-limiting examples or summaries.

Boggy conditions: An unsealed road surface that is wet and soft, which may lead to a vehicle becoming bogged down. This can also apply to loose dry conditions.

Bulldust: A very fine material with flour-like texture, often covering surface irregularities or deep holes.

Changing surface conditions (variance): The condition of the road surface may change along the length of the road, e.g., following road maintenance activities. Wet weather may also cause a localized change in road condition.

Corrugations: An unsealed road surface having ripples or undulations along the road.

Floodway: A localized section of road designed to accommodate temporary overtopping, allowing water to flow over the surface of the road (also known in some aspects as "stream crossing").

Loose surface: A layer of unbound or coarse material on the pavement surface. This can be very fine material (bull dust or sand) or large material in coarse gravel pavements.

Pot holes: Bowl-shaped depressions in the road surface, resulting from the loss of pavement material.

Rough: A consequence of irregularities, uneven in nature, in the longitudinal profile of a road with respect to the intended profile. Interpretation of conditions will not recommend vehicles to use the road at customary speeds.

Rutting: A longitudinal deformation of a pavement surface formed by the wheels of vehicles. This may occur on a sealed or unsealed road.

Slippery surface: The surface becomes slippery in wet conditions or from fuel or material splits, for example.

Stream Crossing: Natural watercourses that cross the road alignment. On sealed roads the crossing would generally be a bridge, floodway, or culvert. On unsealed roads there may be no structure.

Washouts: Steep, irregularity-aided grooves in a road surface caused by erosion of the road surface by water.

As noted above, sensors or devices such as sensors 52 (see FIG. 2) can be configured to detect, measure, quantify and/or sense other things in the external environment of the vehicle 10, including but not limited to the above conditions, e.g., boggy conditions, bulldust, changing surface conditions, corrugations, floodways, loose surfaces, potholes, rough surfaces, rutting, slippery surfaces, stream crossings, washouts, as well as lane markers, signs, traffic lights, traffic signs, lane lines, crosswalks, curbs proximate the vehicle 10, off-road objects, etc.

By virtue of the features described herein, the disclosed technology in one aspect provides an edge and cloud architecture such as edge/cloud architecture 400 of FIG. 4 built to accommodate the MDT framework 100 for connected vehicles (whether human or autonomous or a combination of both). The data-driven platform embodied in the MDT framework 100 for both real-time and bulk-batch ingestion, processing, and analytics enables the active road surface maintenance service(s) described herein. As shown in FIG. 4, this architecture in one example embodiment comprises a cloud layer, an edge layer, a device layer, and an API layer. The active road surface maintenance microservice may be located in the cloud layer and can compute a rewards value for each road/lane or for various suggested routes based on multiple data inputs from other layers. The output is sent back to the vehicle in the device layer to guide (autonomous driver) or suggest (human driver) a route or trajectory for the vehicle's future movement.

By virtue of the disclosed technology according to some example embodiments, and compared to typical systems, condition(s) of a road surface can be proactively monitored and maintained by the advanced sensing technology, and guidance or suggestions can be provided to connected vehicles. An edge/cloud framework can allow road infrastructures to transmit data to/from/with connected vehicles and their drivers. Digital Twins of roads and related infrastructures can be provided based on big data sampled in the real world, where machine learning algorithms can be applied to the digital twins to assess current conditions of the roads or predict future conditions of the roads. Compared to typical Digital Twin frameworks that are built for mobility systems, example embodiments of the disclosed technology leverage the power of cloud computing, by virtue of providing a specifically designed cloud/edge architecture. The edge and cloud architecture provided by some example embodiments, with specific components designed to fit the MDT framework, serves not only roads; the disclosed technology can also build the connections among the Digital Twins of multiple building blocks, which are not just limited to road infrastructures, but are also applied to humans (vehicle occupants) and vehicles. Data and models of one of these blocks can benefit the other blocks of the MDT. The disclosed technology can also account for and utilize different time horizons of data: besides the data that is sampled in real time, historical data can also be retrieved from the respective Digital Twins from the data lake(s) to provide the preference information of the specific physical entity. Combining with real-time and historical data, prediction of future information can also be conducted, and such data can be useful for all physical entities in the MDT framework.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters It should be noted that the terms "approximately" and "about" used throughout this disclosure, including the claims, are used to describe and account for small deviations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%

Figure 9:
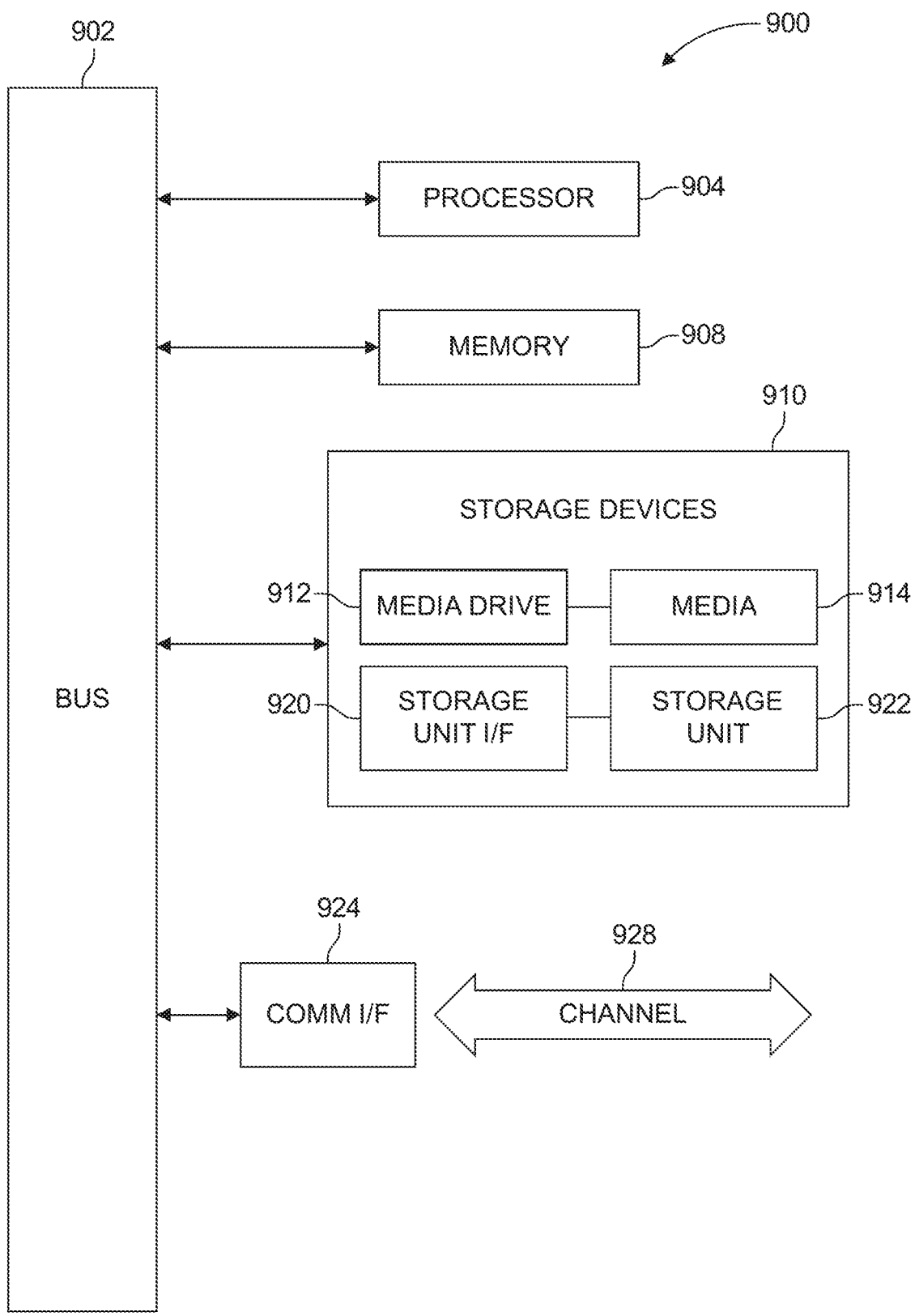
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. This can include a processor, and/or any one or more of the components making up the vehicle data gathering circuit 310 or any processing components/elements of FIG. 4, for example. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method performed in a cloud-based digital space, comprising:
    receiving data regarding a physical object from a physical space within which a vehicle is operating;
    processing the data using machine learning to model road surface conditions, in which respective penalty values are assigned to corresponding road surfaces, a respective penalty value being inversely related to a condition of the corresponding road surface, wherein the penalty values are used to generate a rewards function that categorizes the modeled road surface conditions;
    deriving instructions based on the modeled road surface conditions and applying the rewards function to guide actuation of the vehicle along a trajectory; and
    transmitting the instructions to the physical space connected to the vehicle to guide actuation of the vehicle.

2. The method of claim 1, wherein the processing of the data further comprises storing the data in a data lake.

3. The method of claim 2, wherein the data lake further comprises stored historical data.

4. The method of claim 3, wherein the processing of the data includes processing of the stored historical data in addition to the stored data received from the physical space.

5. The method of claim 1, wherein the physical object comprises at least one of a vehicle, a human, and a traffic device.

6. The method of claim 1, wherein the data is collected by one or more sensors communicating with the physical object.

7. The method of claim 6, wherein the collected data is real-time information relating to one or more of the following: road surfaces, traffic flow, weather, ego vehicle, perception of neighboring vehicle, or occupant of ego vehicle.

8. The method of claim 1, wherein the received data is obtained from one or more monitoring devices associated with the physical object and/or from one or more vehicle-to-anything (V2X) communications regarding the physical object.

9. The method of claim 1, further comprising effecting the actuation of the vehicle along the trajectory when the vehicle is an autonomous vehicle, or prompting a human driver of the vehicle to drive along the trajectory when the vehicle is operated by the human driver.

10. The method of claim 1, further comprising:
    when the vehicle is operated by a human driver, displaying each respective lane of the road surfaces along the trajectory with an indicator that indicates the road surface condition of the respective lane.

11. The method of claim 1, wherein the processing further comprises processing the data using machine learning and historical data to model the road surface conditions and predict future road surface conditions, and using the predicted future road surface conditions to target road surfaces for maintenance.

12. The method of claim 1, further comprising applying a fusion process to the received data and filtering out noisy data.

13. The method of claim 12, wherein the fusion process is effected using a Kalman filter-based sensor fusion algorithm.

14. A cloud-based system effectuating an end-to-end framework, comprising:
   a cloud-based platform hosting one or more digital twins corresponding to one or more physical objects from a physical space within which a vehicle is operating, wherein one of the digital twins comprises a data lake and an active road maintenance microservice;
   a communications layer communicatively connecting the one or more digital twins to the one or more physical objects, wherein:
      the communications layer transmits data regarding the one or more physical objects to at least the one or more corresponding digital twins, and
      the communications layer transmits instructions that have been derived from processing of the transmitted data by at least the active road maintenance microservice to the physical space connected to the vehicle; and
   wherein the active road maintenance microservice:
      processes the data using machine learning to model road surface conditions, in which a rewards function assigns respective rewards values to corresponding road surfaces, a respective rewards value corresponding to a condition of the corresponding road surface, and
      derives the instructions based on the modeled road surface conditions and on optimizing the rewards function to guide actuation of the vehicle along a trajectory.

15. The cloud-based system of claim 14, wherein the one or more physical objects comprise at least one of a vehicle, a human, and a traffic device.

16. The cloud-based system of claim 14, wherein the data lake further comprises stored historical data, and wherein the processing of the data further comprises storing the transmitted data in the data lake and processing the stored historical data in addition to the stored transmitted data.

17. The cloud-based system of claim 14,
   wherein the data is collected by one or more sensors communicating with the one or more physical objects,
   wherein the sensors are equipped on one or more of roads, vehicles, vehicle occupants, or pedestrians, and
   wherein the sensors are one or more of perception sensor, ultrasonic sensor, camera, radar, LIDAR, in-pavement surface temperature and condition sensor, in-pavement surface chemical and concentration sensor, wearable device, road surface sensor, in-cabin sensor, mobile app, loop detector, condition sensor.

18. The cloud-based system of claim 14, further comprising when the vehicle is a non-autonomous vehicle, displaying each respective lane of the road surfaces along the trajectory with an indicator that indicates the road surface condition of the respective lane.

19. A method performed in a cloud-based system effectuating an end-to-end framework, comprising:
   in a digital space:
      receiving data regarding a physical object from a physical space within which a vehicle is operating;
      processing the data using machine learning to model road surface conditions, including using a rewards function generated by penalty values to assign respective rewards values to corresponding road surfaces that categorizes the modeled road surface conditions, a respective rewards value being related to a condition of the corresponding road surface;
      deriving instructions based on applying the rewards function to guide actuation of the vehicle along a trajectory;
      transmitting the instructions to the physical space connected to the vehicle to guide actuation of the vehicle;
   in the physical space:
      receiving the transmitted instructions;
      determining whether the vehicle is an autonomous vehicle or a non-autonomous vehicle; and
      when the vehicle is an autonomous vehicle navigating the vehicle along the trajectory using the instructions, or when the vehicle is a non-autonomous vehicle prompting a human driver to navigate the vehicle along with trajectory using the instructions.

20. The method of claim 19, further comprising:
   when the vehicle is a non-autonomous vehicle, displaying each respective lane of the road surfaces along the trajectory with an indicator that indicates the road surface condition of the respective lane.

* * * * *